(12) United States Patent
Knudson et al.

(10) Patent No.: US 11,599,716 B2
(45) Date of Patent: Mar. 7, 2023

(54) SYSTEMS AND METHODS FOR ANNOTATING AND LINKING ELECTRONIC DOCUMENTS

(71) Applicant: Palantir Technologies Inc., Denver, CO (US)

(72) Inventors: Eric Knudson, Washington, DC (US); Matthew Gerhardt, Bethesda, MD (US); Andrew Elder, New York, NY (US); Eli Rosofsky, Falls Church, VA (US)

(73) Assignee: Palantir Technologies Inc., Denver, CO (US)

( * ) Notice: Subject to any disclaimer, the term of this patent is extended or adjusted under 35 U.S.C. 154(b) by 346 days.

(21) Appl. No.: 17/029,830

(22) Filed: Sep. 23, 2020

(65) Prior Publication Data

US 2021/0004530 A1    Jan. 7, 2021

Related U.S. Application Data

(63) Continuation of application No. 15/662,944, filed on Jul. 28, 2017, now Pat. No. 10,817,655, which is a continuation of application No. 15/088,522, filed on Apr. 1, 2016, now Pat. No. 9,760,556.

(60) Provisional application No. 62/266,533, filed on Dec. 11, 2015.

(51) Int. Cl.
*G06F 40/169* (2020.01)
*G06F 40/134* (2020.01)

(52) U.S. Cl.
CPC .......... *G06F 40/169* (2020.01); *G06F 40/134* (2020.01)

(58) Field of Classification Search
None
See application file for complete search history.

(56) References Cited

U.S. PATENT DOCUMENTS

| 9,514,414 B1 | 12/2016 | Rosswog et al. |
| 9,760,556 B1 | 9/2017 | Knudson et al. |
| 10,817,655 B2 | 10/2020 | Knudson et al. |

OTHER PUBLICATIONS

Lokaiczyk, "Unsupervised Acquisition of Desktop Application Taxonomies" Eighth IEEE International Conference on Advanced Learning Technologies, copyright 2008 IEEE, p. 957-959. (Year: 2008).*
U.S. Pat. No. 9,514,414, Systems and Methods for Identifying and Categorizing Electronic Documents Through Machine Learning, Dec. 6, 2016.
U.S. Pat. No. 9,760,556, Systems and Methods for Annotating and Linking Electronic Documents, Sep. 12, 2017.

(Continued)

*Primary Examiner* — Amelia L Tapp
(74) *Attorney, Agent, or Firm* — Knobbe, Martens, Olson & Bear LLC

(57) ABSTRACT

Computer implemented systems and methods are disclosed for annotating and linking electronic documents. In accordance with some embodiments, annotations assigned to source electronic documents are received and snippets are generated from the received annotations. The generated snippets are aggregated into clusters, which are used to generate an electronic document. Links between the snippets and their respective source documents may be generated and embedded in the generated electronic document.

18 Claims, 13 Drawing Sheets

(56) References Cited

OTHER PUBLICATIONS

U.S. Pat. No. 10,817,655, Systems and Methods for Annotating and Linking Electronic Documents, Oct. 27, 2020.
U.S. Appl. No. 15/336,302, Systems and Methods for Identifying and Categorizing Electronic Documents Through Machine Learning, filed Oct. 27, 2016.

* cited by examiner

SYSTEMS AND METHODS FOR ANNOTATING AND LINKING ELECTRONIC DOCUMENTS

CROSS-REFERENCE TO RELATED APPLICATIONS

This application is a continuation of U.S. patent application Ser. No. 15/662,944, filed Jul. 28, 2017, entitled "SYSTEMS AND METHODS FOR ANNOTATING AND LINKING ELECTRONIC DOCUMENTS," which application is a continuation of U.S. patent application Ser. No. 15/088,522, filed Apr. 1, 2016, entitled "SYSTEMS AND METHODS FOR ANNOTATING AND LINKING ELECTRONIC DOCUMENTS," which application claims the benefit of U.S. Provisional Patent Application No. 62/266,533, filed Dec. 11, 2015, entitled "SYSTEMS AND METHODS FOR ANNOTATING AND LINKING ELECTRONIC DOCUMENTS," both of which are incorporated herein in their entireties.

Any and all applications for which a foreign or domestic priority claim is identified in the Application Data Sheet as filed with the present application are hereby incorporated by reference under 37 CFR 1.57.

BACKGROUND

Reviewing and categorizing large corpuses of electronic documents can be a time consuming endeavor. For example, users may be assigned a subset of a corpus to review and categorize manually. Corpuses, however, may include on the order of millions of electronic documents that may need to be reviewed and categorized in a very short time period, and manual review of the corpus may not be efficient enough to accommodate such narrow time periods.

Some automated techniques for reviewing and categorizing corpuses of electronic documents exist that may provide improved efficiency over manual review. The available automated techniques, however, are not without their own flaws. For example, some automated techniques may produce highly inaccurate categorizations of electronic documents and may not provide a robust mechanism to improve the performance of the automated techniques. As a result, the existing automated techniques may result in relevant documents from being missed and/or highly confidential electronic documents being inadvertently provided to a third party.

BRIEF DESCRIPTION OF THE DRAWINGS

Reference will now be made to the accompanying drawings, which illustrate exemplary embodiments of the present disclosure and in which.

DETAILED DESCRIPTION OF EXEMPLARY EMBODIMENTS

Figure 1:
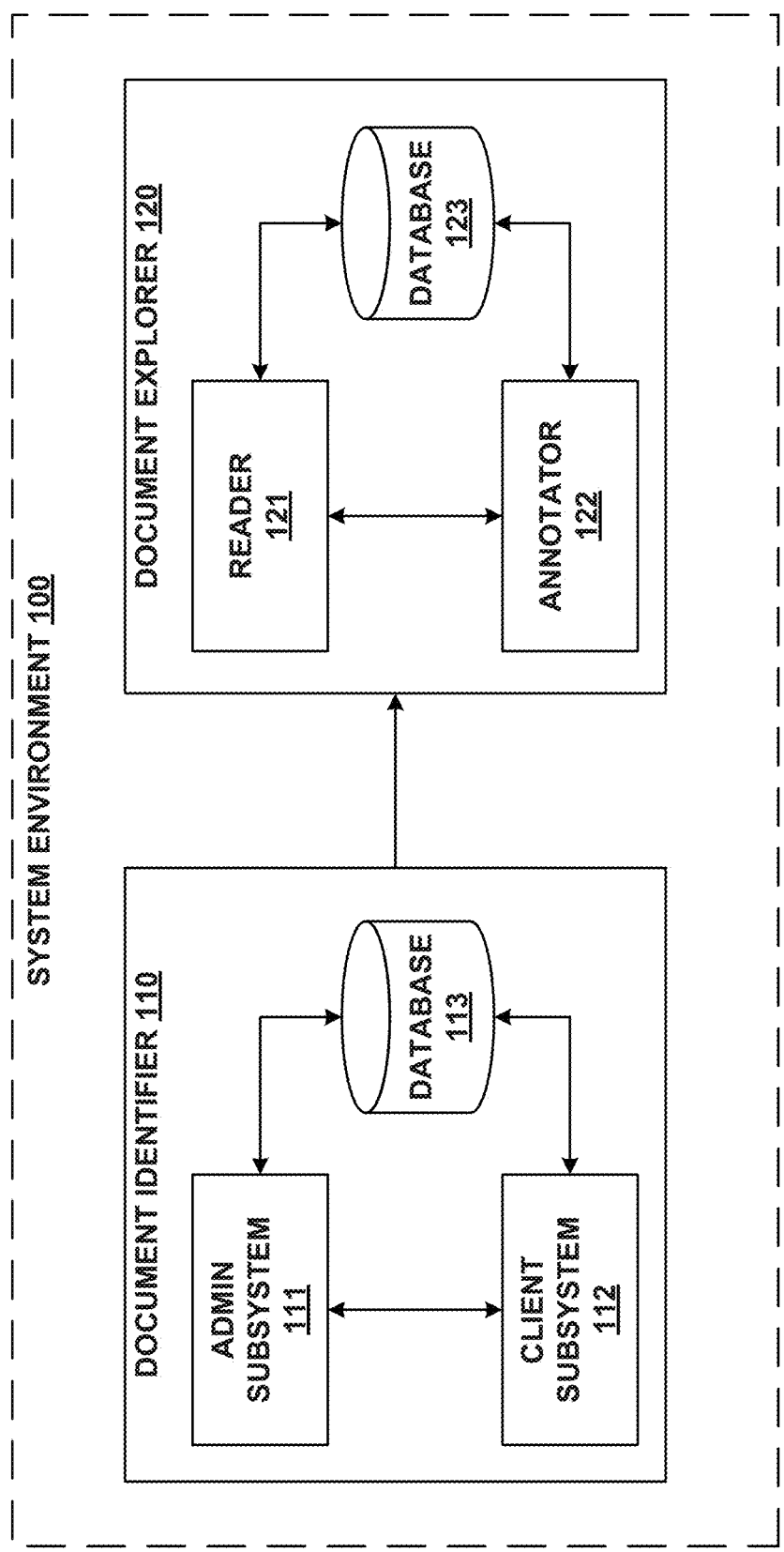
FIG. 1 is a block diagram of an exemplary system for identifying and exploring electronic documents, consistent with embodiments of the present disclosure.

The disclosed embodiments describe systems methods for identifying electronic documents through machine learning. The electronic document identification methods and systems are designed to efficiently identify and categorize electronic documents included in a corpus of electronic documents. The corpus of electronic documents may be significant in size (e.g., on the order of millions of electronic documents) and may include documents of various types with differing content. With very little input from a user, the disclosed electronic document categorization systems and methods can use a small seed set of electronic documents that have been identified to be highly relevant to identify other relevant electronic documents in the corpus through machine learning techniques. The disclosed systems and methods are useful for identifying relevant documents in a large corpus where the number of relevant documents in the corpus relative to the number of non-relevant documents is small (i.e., for identifying "needle in a haystack" electronic documents).

In order to improve the reliability of the disclosed electronic document categorization systems and methods, additional seed sets may be generated from electronic documents included in the corpus. The generated seed sets may be categorized by a user and fed into the applied machine learning system in order to retrain or further train the electronic document categorization systems and methods. Once retrained on a new seed set of categorizations, the retrained electronic document categorization systems and methods may again categorize the remaining documents in the corpus and track the performance of the categorization. The disclosed electronic document categorization systems and methods may iterate through additional seed sets and corpus categorizations until a desired categorization performance is obtained.

Once the desired performance has been obtained and the relevant documents in the corpus have been identified, the identified relevant documents may be packaged for production and/or explored and manipulated for various purposes. In some embodiments, the identified relevant electronic documents may be produced as part of a document discovery activity in an ongoing legal proceeding, in response to a legal process such as a warrant or subpoena for documents, as part of an internal investigation, for documenting legal compliance, or in preparation for an imminent legal proceeding. When an entity becomes a part of a legal proceeding, they may have a very short time frame (e.g., as little as a few weeks to a month in some cases) to review millions of electronic documents and produce the relevant ones as part of discovery. The disclosed electronic document categorization systems and methods accommodate these needs by providing numerous improvements over prior systems and methods, including significantly reducing the amount of time required by electronic document categorization systems and methods to review and identify relevant electronic documents, increasing the accuracy of identifying documents that are actually relevant to discovery (and therefore minimizing production of documents that are not relevant), and minimizing the risk of inadvertently producing sensitive documents (e.g., confidential and/or privileged documents).

The disclosed embodiments further describe improved systems and methods for annotating and linking electronic documents among the corpus of produced electronic documents. In some embodiments, the disclosed systems and methods allow for electronic documents to be efficiently searched, read, and annotated. The annotated electronic documents may be clustered with other electronic documents and used for purposes such as to establish legal theories and/or to identify related structured and unstructured electronic content. In one example, produced electronic documents provided may be identified, annotated, and clustered in order to prove an aspect of legal theory such as fraud (e.g., to prove that fraud has occurred). The clustered electronic documents may be used to identify structured and unstructured electronic content that can be used to prove another aspect of the legal theory (e.g., to prove knowledge of fraud). Other uses of annotated document clusters include performing internal investigations and for documenting and demonstrating compliance with laws, regulations, company policies, etc.

In some embodiments, the disclosed annotating and linking systems and methods may automatically generate electronic documents from annotations and clusters of electronic documents. For example, annotated content included in an electronic document clustered on a legal theory may be automatically imported into a generated electronic document such as a memorandum on the legal theory. These snippets of electronic content may be used to form the basis of the legal theory that is eventually completed by a user. The disclosed annotating and linking systems and methods may maintain a link between the snippets imported into the generated electronic document and the annotated electronic document from which the snippet was harvested. The links established by the disclosed annotating and linking systems and methods improve the traceability of the connections between annotated electronic documents and the snippets eventually used to generate the final electronic document (i.e., the electronic memorandum eventually completed by the user).

Reference will now be made in detail to exemplary embodiments, the examples of which are illustrated in the accompanying drawings. Whenever possible, the same reference numbers will be used throughout the drawings to refer to the same or like parts.

FIG. 1 is a block diagram of an exemplary system environment 100 for identifying and linking electronic documents, consistent with embodiments of the present disclosure. As shown in FIG. 1, system environment 100 includes a number of components such as a document identifier 110 and a document explorer 120. It will be appreciated from this disclosure, however, that the number and arrangement of these components is exemplary only and provided for purposes of illustration. Other arrangements and numbers of components may be utilized without departing from the teachings and embodiments of the present disclosure. For example, while document identifier 110 and a document explorer 120 are shown in FIG. 1 to be separate entities that are communicatively coupled, some or all of the components and/or features of document identifier 110 may be included in, and performed by, document explorer 120 or vice versa.

In some embodiments, document identifier 110 may identify and categorize documents in a corpus of electronic documents. The corpus may be a large corpus (e.g., on the order of millions) of electronic documents of various types and content. In some embodiments, the electronic documents included in the corpus may be structured electronic documents. Once document identifier 110 has identified and categorized the electronic documents in the corpus, document identifier 110 may package at least a subset of the electronic documents and provide the electronic document package to document explorer 120 to be explored and manipulated for various purposes.

Document identifier 110 may include an admin subsystem 111, a client subsystem 112, and a database 113. In certain embodiments, components 111-113 may be standalone systems or devices, or may be part of a subsystem, which may be part of a larger system. For example, document identifier 110 may represent a distributed system that includes remotely located sub-system components (e.g., components 111-113) that communicate over a communications medium (e.g., a network).

Admin subsystem 111 may receive data and information from various devices and systems, such as, for example, client subsystem 112 and database 113. For example, admin subsystem 111 may receive electronic documents, electronic communications (e.g., text or instant messages, voice over internet protocol (VoIP) calls, emails, etc.), instructions, etc. from client subsystem 112 and other devices and systems. Admin subsystem 111 may import the received electronic documents and communications, and the data included therein, into one or more databases such as, for example, database 113.

In some embodiments, admin subsystem 111 may generate seed sets of electronic documents that may be initially categorized by one or more client subsystems 112. Each generated seed set may be selected by admin subsystem 111 based on input received from a user (e.g., an admin or an electronic discovery manager in the context of an e-discovery project). The user may specify which electronic documents will be included in each seed set and may assign seed sets to different users of client subsystems 112. Once the seed sets are generated, admin subsystem 111 may provide the seed sets to client subsystems 112 along with an optional notification that the seed sets are available for categorization by client subsystem 112. In some embodiments, providing a seed set to client subsystem 112 may include providing a list of electronic documents included in the seed set and instructions to retrieve the electronic documents from a database (e.g., database 113). In some other embodiments, providing a seed set to client subsystem 112 may include providing the electronic documents included in the seed set to client subsystem 112.

Client subsystem 112 may send and receive data and information from various devices and systems, such as, for example, admin subsystem 111 and database 113. For example, client subsystem 112 may send and receive electronic documents, electronic communications (e.g., text or instant messages, voice over internet protocol (VoIP) calls, emails, etc.), notifications (e.g., notifications that seed sets of electronic documents are available for categorization), instructions, etc. from admin subsystem 111 and other devices and systems. Admin subsystem 111 may import the received electronic documents, seed sets, and communications, and the data included therein, into one or more databases such as, for example, database 113.

In some embodiments, client subsystem 112 may receive seed sets from admin subsystem 111 and categorize the received seed sets based on input received from a user. In order to begin the categorization process, client subsystem 112 may retrieve the electronic documents included in the received seed set from a database (e.g., database 113). Client subsystem 112 may receive categorizations for each electronic document from the user. Categorizations may include, for example, that an electronic document is relevant or not relevant (e.g., relevant to a legal proceeding, investigation, request for document production such as a subpoena or warrant, etc.), confidential or not confidential (e.g., confidential to the party whom has been requested to produce the electronic documents), privileged or not privileged and other categorizations. The categorizations assigned to each electronic document in the seed set may be stored along with the electronic document in database 113 as, for example, metadata (e.g., XML metadata) or another form of structured information. Once client subsystem 112 has categorized all of the documents in the seed set, client subsystem 112 may provide a notification to admin subsystem 111 that categorization is complete. The notification may be provided automatically (e.g., client subsystem 112 sends the notification responsive to the last electronic document in the seed set being categorized) or in response to input from the user (e.g., the user provides input to client subsystem 112 in the form of instructions to notify admin subsystem 111 that categorization is complete).

Admin subsystem 111 may review the categorizations of the electronic documents in the seed set and use the categorizations to categorize the remaining electronic documents in the corpus. In some embodiments, admin subsystem 111 may train a document categorizer using various machine learning techniques on the categorizations of the electronic documents in the seed set and apply the trained document categorizer to the remaining electronic documents in the corpus to categorize the electronic documents. Once admin subsystem 111 has completed categorizing the remaining documents in the corpus using the machine learning techniques, admin subsystem 111 may review various metrics reflecting the performance of the document categorizer. If admin subsystem 111 determines that the metrics indicate the performance of the categorization is insufficient (e.g., by comparing the metrics to thresholds and determining that one or more metrics are below the thresholds or by receiving input from the user indicating performance is insufficient), admin subsystem 111 may generate additional seed sets for client subsystem 112 to categorize and may use the categorizations of the additional seed sets to retrain the document categorizer using machine learning techniques and to improve the document categorizer's performance.

Admin subsystem 111 retrains the document categorizer by iterating through various rounds of seed sets until the performance metrics (or the user) indicate that categorization of the electronic documents in the corpus is successful. For example, the performance metrics (or user) may indicate a high confidence that the categorizations of the electronic documents (e.g., relevant or not relevant, confidential or not confidential, privileged or not privileged, etc.) are accurate and therefore the electronic documents are ready for production.

Document identifier 110 may produce some or all of the electronic documents in the categorized corpus by providing the electronic documents to a third party (e.g., an opposing party in a legal proceeding, a party asserting a subpoena or warrant for documents, etc.), a specified database, and/or document explorer 120. In some embodiments, document identifier 110 provides only electronic documents assigned one or more specific categorizations (e.g., relevant electronic documents, relevant and non-confidential electronic documents, privileged and not privileged electronic documents, etc.).

Document explorer 120 may receive the produced electronic documents from document identifier 110. For example, document explorer 120 may receive the produced electronic documents from document identifier 110 via a wireless or wired network (not shown), via a wireless or wired direct communications link, or any other form of communication. As another example, document identifier 110 may store the produced electronic documents in a database (not shown) accessible by document explorer 120 and may provide document explorer 120 with a notification that the produced electronic documents are available to be accessed by document explorer 120. Document explorer 120 may then retrieve and/or explore the electronic documents from the database and/or store the electronic documents in a local database (e.g., database 116).

Document explorer 120 may explore, annotate, and link electronic documents produced by document identifier 110. Document explorer 120 may include a reader 121, an annotator 122, and a database 123. In certain embodiments, components 121-123 may be standalone systems or devices, or may be part of a subsystem, which may be part of a larger system. For example, document explorer 120 may represent a distributed system that includes remotely located subsystem components (e.g., components 121-123) that communicate over a communications medium (e.g., a network).

In some embodiments, reader 121 may enable users to search, sort, filter, and read through electronic documents. Annotator 122 may enable users to annotate, cluster, and link electronic documents. Annotations may be used to identify portions of an electronic document (referred to herein as "snippets") such as text, audio, video, pictures, and assign text-based annotations to the identified portions. Other types of annotations may be used, such as audio, video, and picture annotations. Moreover, snippets may be annotated by assigning links to other electronic documents to the snippet (e.g., a link to an email or a webpage). Clusters may include electronic documents that are grouped based on various characteristics of those documents. For example, documents may be clustered based on their content, based on various attributes (e.g., senders and/or recipients of an email, when an electronic document was sent, created, or modified, etc.), based on type, etc. As another example, electronic documents may be clustered based on a purpose such as, for example, establishing a legal theory (e.g., fraud, murder, negligence, etc.).

In addition, annotator 122 may generate electronic documents from annotations and clusters of electronic documents. For example, annotated snippets included in an electronic document clustered on a legal theory may be automatically imported into a generated electronic document such as a memorandum on the legal theory. Annotator 122 may generate links between the snippets included in the generated electronic document and the source electronic document (i.e., the electronic document from which the snippet originated). The links between snippets and source electronic documents are particularly useful for maintaining traceability between information used in a generated electronic document and the electronic documents used to support the information. The generated links not only provide a solution for quickly identifying the origin of information used in a generated electronic document, they also allow users to identify other electronic documents that may contain similar content. For example, a user that is interested in more information related to a snippet included in a generated electronic document may use the link between the snippet and its source electronic document to identify the source electronic document and use the source electronic document to find electronic documents including similar content.

Database 113 and 123 may include one or more logically and/or physically separate databases configured to store data. The data stored in database 113 may be received from admin subsystem 111, from client subsystem 112 and/or may be provided as input using conventional methods (e.g., data entry, data transfer, data uploading, etc.). The data stored in the database 113 may take or represent various forms including, but not limited to, electronic documents in the form of presentations, textual content, spreadsheets, emails, instant messages, social media content, websites and cached webpages, and any other form or type of electronic document; categorizations for the stored electronic documents, user profile information associated with users of admin subsystem 111 and client subsystem 112, and a variety of other electronic data or any combination thereof. In some embodiments, database 113 includes a database that stores electronic documents and their assigned categorizations, a database that stores user profile information, and a database that stores seed sets. In still some other embodiments, the databases that store electronic documents and their assigned categorizations, user profiles, and seed sets can be combined into various combinations. In still some other embodiments, database 113 includes a single database that stores electronic documents and their assigned categorizations, user profiles, and seed sets.

The data stored in database 123 may be received from reader 121, from annotator 122 and/or may be provided as input using conventional methods (e.g., data entry, data transfer, data uploading, etc.). The data stored in the database 123 may take or represent various forms including, but not limited to, electronic documents in the form of presentations, textual content, spreadsheets, emails, instant messages, social media content, websites and cached webpages, and any other form or type of electronic document; annotations associated with electronic documents, links between electronic document, document clusters, categorizations for the stored electronic documents, user profile information associated with users of document explorer 120, and a variety of other electronic data or any combination thereof. In some embodiments, database 123 includes a database that stores electronic documents and their assigned categorizations, a database that stores user profile information, and a database that stores annotations, electronic document links, and clusters. In still some other embodiments, the databases that store electronic documents and their assigned categorizations, user profiles, and annotations, links, and clusters can be combined into various combinations. In still some other embodiments, database 123 includes a single database that stores electronic documents and their assigned categorizations, user profiles, and annotations, links, and clusters.

In some embodiments, database 113 and 123 may be implemented using any suitable form of a computer-readable storage medium. In some embodiments, database 113 and 123 may be maintained in a network attached storage device, in a storage area network, or combinations thereof, etc. Furthermore, database 113 and 123 may be maintained and queried using numerous types of database software and programming languages, for example, SQL, MySQL, IBM DB2®, Microsoft Access®, PERL, C/C++, Java®, etc. Although FIG. 1 shows database 113 associated with admin subsystem 111 and client subsystem 112 and database 123 associated with reader 121 and annotator 122, database 113 and 123 may be standalone databases that are accessible via a network (not shown), database 113 and/or 123 may be included in one or more subsystems (e.g., admin subsystem 111, client subsystem 112, reader 122, and/or annotator 122), or database 113 and 116 may be associated with or provided as part of a system or environment that may be accessible to admin subsystem 111, client subsystem 112, reader 121, annotator 122, and/or other components.

The network between admin subsystem 111, client subsystem 112, and database 113; and between reader 121, annotator 122, and database 123 may include any combination of communications networks. For example, the network may include the Internet and/or any type of wide area network, an intranet, a metropolitan area network, a wired or wireless local area network (LAN) (e.g., WiFi), a cellular communications network, a direct connection (e.g., Bluetooth, near-field communication (NFC), WiFi Direct), etc. In some embodiments, admin subsystem 111, client subsystem 112, and database 113; and reader 121, annotator 122, and database 123 may communicate through the same network, and in other embodiments, admin subsystem 111, client subsystem 112, and database 113; and reader 121, annotator 122, and database 123 may communicate to each other via their own individual networks.

Figure 2:
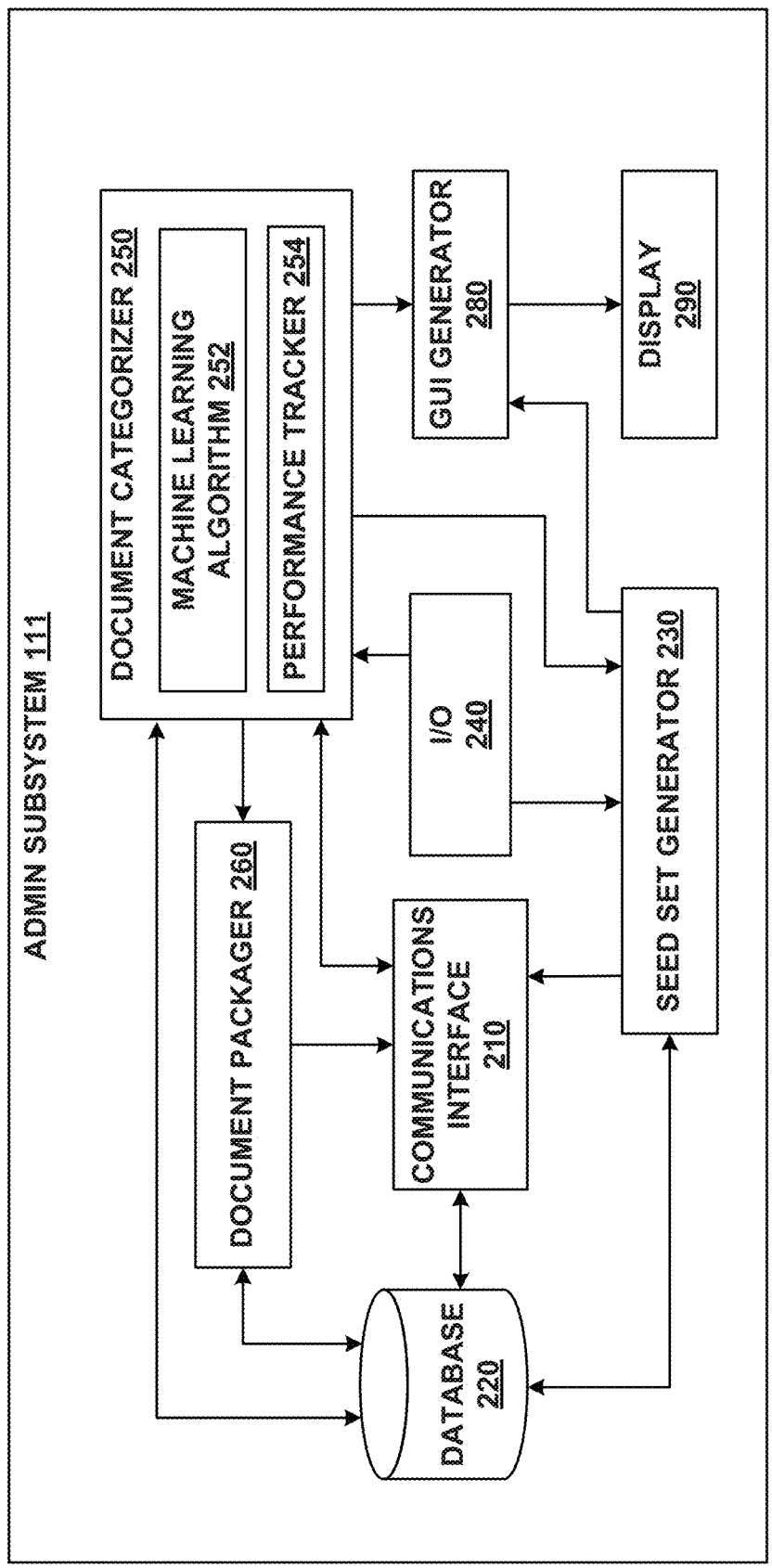
FIG. 2 is a block diagram of an exemplary admin subsystem, consistent with embodiments of the present disclosure.

FIG. 2 is a block diagram of an exemplary admin subsystem 111 for implementing embodiments and aspects of the present disclosure. The arrangement and number of components included in admin subsystem 111 is provided for purposes of illustration. Additional arrangements, number of components, and other modifications may be made, consistent with the present disclosure.

As shown in FIG. 2, admin subsystem 111 may include one or more communications interfaces 210. Communications interface 210 may allow electronic data to be transferred between admin subsystem 111, client subsystem 112, database 113, document explorer 120, and/or other components. For example, communications interface 210 may be configured to receive a corpus of electronic documents and store the corpus in database 220. Some non-limiting examples of electronic documents include structured electronic files such as spreadsheets, text files, comma separated values (CSV) files, presentations, archived and compressed files (e.g., ZIP files, 7z files, cab files, RAR files, etc.), database files. PDF files, PUB files, image files, XML files, specialized tax and financial files (e.g., Open Financial Exchange and Interactive Financial Exchange files), tabulated data files, and webpage files (e.g., HTML files), electronic communications (e.g., emails, texts, picture messages, instant messages, etc.), and any other types of structured electronic documents. The received electronic documents may include various types of content. For example, the received electronic data files may include text, pictures, videos, audio, etc. Communications interface 210 may also receive electronic document categorizations from client subsystem 112. The categorizations may be received in the form of metadata (e.g., XML metadata) or another form of structured information. Admin subsystem 111 may store the received categorizations in database 220. Communications interface 210 may further receive electronic communications (e.g., emails, texts, picture messages, instant messages, etc.), instructions (e.g., instructions to produce documents), and other information.

Examples of communications interface 210 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 210 may receive data in the form of signals, which may be electronic, electromagnetic, optical, or other signals capable of being received by communications interface 210. These signals may be provided to communications interface 210 via a communications path (not shown), which may be implemented using wireless, wire, cable, fiber optics, radio frequency ("RF") link, and/or other communications channels.

Admin subsystem 111 may also include one or more databases 220. Database 220 may be configured to store corpuses of electronic documents, seed sets, electronic document categorizations, performance metrics, user profiles, etc. In some embodiments, database 220 may be used to implement some or all of the functions of database 113 of FIG. 1.

Admin subsystem 111 may also include one or more seed set generators 230 that may generate seed sets of electronic documents stored in database 220. In some embodiments, a seed set may include a portion of the electronic documents included in a larger corpus of electronic documents. A corpus may be a collection of electronic documents that is provided by an entity as part of a legal proceeding, in response to a legal process (e.g., a subpoena or warrant), an investigation, or provided for any other purpose. Admin subsystem 111 may maintain the electronic documents included in a corpus separate from electronic documents included in other corpuses in database 220.

In some embodiments, seed set generator 230 may generate seed sets based on input received from a user. For example, admin subsystem 111 may include one or more input/output (I/O) devices 240 (e.g., physical keyboards, virtual touch-screen keyboards, mice, joysticks, styluses, etc.) that are configured to receive user instructions in the form of user input. The received instructions may include instructions to generate one or more seed sets and instructions that identify the electronic documents that are to be included in each seed set. I/O 240 may provide the received user instructions to seed set generator 230 and seed set generator 230 may execute the instructions. The user may use seed set generator 230 to select electronic documents to include in a seed set based on various criteria and/or purposes. For example, the electronic documents may be selected so that there are relatively equal number of likely relevant documents and likely not relevant documents included in the seed set so that a document categorizer 250 may learn what relevant documents as well as not relevant documents look like. As another example, the electronic documents may be selected based on subject matter (e.g., documents related to a company, an event, a place, etc.) and may include one or more subject matter topics.

Admin subsystem 111 may also include a graphical user interface (GUI) generator 280 that generates an interactive GUI for display on a display 290. GUI generator 280 may generate a seed set generator GUI for the user to identify various parameters for the seed sets that are generated by seed set generator 230. For example, the seed set generator GUI may provide the user the option to specify parameters such as the reviewer to whom the seed set will be assigned, subject matter tags that identify the main subject matter included in the seed set (e.g., documents relating to a specific entity, a specific time period, etc.), deadlines (e.g., specific points in time by which reviewer should complete categorization of the electronic documents included in the seed set), etc.

In some embodiments, the seed set generator GUI may provide search capabilities so that the user may search a corpus of electronic documents to identify specific electronic documents that are to be included in a seed set. The search functionality may allow the user perform keyword searches that search the content of the electronic documents included in the corpus (e.g., document titles, subject lines in emails, content in the body of a word processing document or email, etc.) and/or structured data associated with the electronic documents (e.g., To and From fields in an email, metadata, domain names included in email addresses, etc.). The search capabilities may also include various parameter filters such as time ranges (e.g., inclusive and non-inclusive "to" and "from" dates, a "before" date, an "after" date when documents where created or modified, when emails where sent, etc.), names (e.g., names of person(s) included in a To, From, or CC field in an email, name of a document creator or custodian, etc.), and any other content filters. The filters may be used to specify that electronic documents including certain parameters are to be included in the search results or omitted from the search results. For example, the filters may be used to include emails that were sent to an entire company or to omit emails that were sent to the entire company.

In some embodiments, the seed set generator GUI may provide various metrics and information associated with the reviewers assigned to process the generated seed sets. Examples include the reviewers assigned to each corpus, the number of documents categorized by each reviewer for each corpus, the number of documents categorized per time period (e.g., per day, per hour, etc.), their biographies, their subject matter expertise, past work assignments (e.g., past legal proceedings), the review progress of each seed set assigned to a reviewer (e.g. percentage or number of electronic documents categorized in the seed set), the number or percentage of electronic documents categorized in each category type by each reviewer (e.g., relevant/not relevant, confidential/not confidential, privileged/not privileged, etc.), and other metrics and information. In some embodiments, the seed set generator GUI allows the user to sort the metrics and information in various ways. For example, the metrics and information may be sorted by reviewer, by legal proceeding, by legal process, by investigation, by reviewer team, etc. The seed set generator GUI may also provide an electronic communications interface that allows the user of admin subsystem 111 to send and receive communications from client subsystems 112 (e.g., instant messages, emails, message boards, etc.).

In some embodiments, seed set generator 230 may generate reports that include all of the parameters used to define each generated seed set as well as other attributes of the generated seed sets so that the parameters and attributes may be presented in a human-readable format. For example, the report may include a list of all of the filters used to identify electronic documents the were included in a seed set, the types of electronic documents included in the seed set, the number of electronic documents for each type of electronic document included in the seed set, etc.

Admin subsystem 111 may provide generated seed sets to one or more client sub systems 112 for categorization. For example, where each seed set is assigned to a reviewer, admin subsystem 111 may provide the assigned seed set to the client subsystem 112 associated with the reviewer through communications interface 210. In order to provide the seed set to client subsystem 112, seed set generator 230 may retrieve the electronic documents included in the seed set from database 220 and provide the electronic documents to client subsystem 112.

Admin subsystem 111 may receive categorizations of electronic documents included in seed sets from client subsystem 112. The received categorizations may be received through communications interface 210 and stored in database 220. Document categorizer 250 may retrieve the seed set categorizations from database 220 and use a machine learning algorithm 252 to train on the seed set categorizations. Once document categorizer 250 is trained, it may be used to categorize the remaining electronic documents in the corpus from which the seed set was generated.

Machine learning algorithm 252 may train document categorizer 250 on the categorizations of electronic documents in a seed set using various training techniques. For example, machine learning algorithm 252 may train document categorizer 250 by identifying properties of electronic documents assigned a given type of categorization (e.g., relevant or not relevant) and associate the identified properties (or combinations of identified properties) with that type of categorization. For example, machine learning algorithm 252 may parse the content included in an electronic document categorized as relevant to identify one or more strings of words (e.g., using natural language processing) and may associate the identified strings with electronic documents that tend to be relevant. Similarly, machine learning algorithm 252 may perform the same techniques on electronic documents identified as not relevant, confidential, not confidential, privileged, not privileged, etc. Other example machine learning techniques used by machine learning algorithm 252 may include supervised learning techniques such as importance weighted active learning, support vector machines, regression analysis, decision trees, neural networks, relevance vector machines, logistic regression, ensemble learning, and naive Bayes classifiers. Machine learning algorithm 252 may also use unsupervised learning techniques such as clustering. In order to kick-off training of machine learning algorithm 252 using clustering, a user may feed in electronic document models (alternatively or in addition to using seed sets) to machine learning algorithm 252 to train on. An electronic document model may be an electronic document that is modelled after the types of electronic documents the user desires document categorizer 250 to assign a certain categorization. For example, a user may create an electronic spreadsheet model that includes a certain configuration of column and rows and may specify that electronic documents in the corpus that conform to the model are to be assigned a relevant categorization.

Once machine learning algorithm 252 has been trained on the seed set categorizations, document categorizer 250 may categorize the remaining electronic documents in the corpus using the trained machine learning algorithm 252. In addition to assigning categorizations, document categorizer 250 may assign other properties to the electronic documents. For example, document categorizer 250 may assign confidence modifier to categorized electronic documents. An electronic document's confidence modifier may indicate how confident document categorizer 250 is that the categorization it assigned to the electronic document is the correct categorization. The confidence modifier may take on various forms, for example, a percentage (e.g., 86% confident) and/or a qualitative label (e.g., very confident, somewhat confident, not confident, etc.).

Another example of properties that may be assigned to electronic documents by document categorizer 250 is an importance weight. The importance weight of an electronic document may reflect how important the categorization of the electronic document is to document categorizer 250. A greater importance weight may indicate that the electronic document's categorization may be useful for training machine learning algorithm 252 to improve its performance. Conversely, lesser importance weight may indicate that the electronic document's categorization may not be useful for training machine learning algorithm 252 to improve its performance. Document categorizer 250 may determine the importance weight to assign to an electronic document based on various criteria. For example, document categorizer 250 may determine an importance weight based on a confidence metric associated with document categorizer 250's confidence in the categorization it assigned to the electronic document. Accordingly, the importance weight may be determined based on an inverse relationship to the confidence metric (i.e., the more confident document categorizer 250 is in its categorization assignment the lower the importance weight may be). As another example, document categorizer 250 may determine an importance weight based on the number of electronic documents that share similar characteristics with the electronic document. For example, an email between a CEO and CFO of a company that includes the phase "Operation Treadstone" may be assigned a high importance weight if the corpus also includes a large number of emails with the same characteristics. In the example, the email may be considered to be important to training machine learning algorithm 252 because an accurate categorization of the email may lead to an accurate categorization of a large portion of the corpus.

In some embodiments, when the metrics tracked by performance tracker 254 indicate that the performance of machine learning algorithm 252's categorization of the corpus is not adequate, document categorizer 250 may send an indication to seed set generator 230 that a second or subsequent seed set of electronic document classifications is needed to retrain machine learning algorithm 252 to improve its categorization performance. Alternatively, the user of admin subsystem 111 may provide the indication to seed set generator 230 through I/O 240 after reviewing the performance metrics on the performance GUI. Seed set generator 230 may generate the second seed set by selecting electronic documents that have not yet been categorized by a client subsystem 112 (i.e., electronic documents different from the electronic documents included in the first seed set) and send the second seed set to one or more client subsystems 112 for categorization. Admin subsystem 111 may receive the categorizations of the electronic documents included in the second seed set via communications interface 210 and provide them to document categorizer 250. Document categorizer 250 may retrain machine learning algorithm 252 on the second seed set categorizations using the training techniques described above. Once machine learning algorithm 252 has been retrained, document categorizer 250 may re-categorize the electronic documents in the corpus using retrained machine learning algorithm 252.

In some embodiments document categorizer 250 may include a performance tracker 254 that tracks one or more metrics associated with the performance of document categorizer 250's categorizations. The metrics may include the number of electronic documents categorized in each category (e.g., relevant and not relevant), the confidence modifiers of all the categorized electronic documents, etc. In some embodiments, seed set generator 230 may generate additional seed sets based on the metrics tracked by performance tracker 254. For example, document categorizer 250 may compare a confidence modifier metric to a threshold value and determine that an additional seed set of categorizations is needed when the confidence modifier metric is less than the threshold value. The confidence modifier metric may include the number of electronic documents assigned to each confidence modifier value (e.g., the number of electronic documents assigned to each confidence percentage value or each qualitative confidence label). The threshold value may be determined based on various requirements, for example, time constraints for producing the electronic documents, desired accuracy of electronic document categorizations, etc.

In some embodiments, a user may review the performance metrics and provide instructions in the form of input via I/O 240 to seed set generator 230 to generate the additional seed set. Seed set generator 230 may generate the additional seed set automatically based on various factors. For example, seed set generator 230 may identify electronic documents that have been assigned a low confidence modifier and/or a high importance weight, and assign those electronic documents to the seed set. Seed set generator 230 may continue to add electronic documents until the desired number of electronic documents have been added to the seed set. Seed set generator 230 may provide the additional seed set to client device 112 for categorization, receive categorizations from client device 112, and retrain machine learning algorithm 252 based on the categorizations for the additional seed set.

Document categorizer 250 may iterate through various rounds of corpus categorizations using additional seed set categorizations until the performance metrics tracked by performance tracker 254 indicate a high confidence that the categorizations are accurate. Once a high confidence of accurate categorization is achieved, document categorizer 250 may provide instructions to a document packager 260 to package a portion of the electronic documents in the corpus for production. In some embodiments, document categorizer 250 may provide the instructions automatically, for example in response to determining that the one or more metric values tracked by performance tracker 254 are above a threshold value. In some other embodiments, document categorizer 250 may provide a notification to the user (via GUI generator 280) that a high confidence that a high confidence of accurate categorization has been achieved and prompt the user to provide the instructions in the form of input via I/O 240.

Document packager 260 may package a portion of the electronic documents in the corpus that have been assigned one or more specific categorizations by document categorizer 250. For example, document packager 260 may only include the electronic documents that have been assigned a "relevant" categorization. As another example, document packager 260 may only include the electronic documents that have been assigned a "relevant" categorization and a "not confidential" categorization, the electronic documents that have been assigned a "relevant" categorization and a "not privileged" categorization, or the electronic documents that have been assigned a "relevant" categorization, a "not confidential" categorization, and a "not" privileged categorization. Document packager 260 may retrieve the electronic documents to be packaged from database 220, package them, and provide them, for example, to document explorer 120.

Seed set generator 230, document categorizer 250, document packager 260, and GUI generator 280 may be implemented as a hardware modules configured to execute the functions described herein. Alternatively, one or more processors suitable for the execution of instructions may be configured to execute the functions of seed set generator 230, document categorizer 250, document packager 260, and GUI generator 280. For example, suitable processors include both general and special purpose microprocessors, programmable logic devices, field programmable gate arrays, specialized circuits, and any one or more processors of any kind of digital computer that may be communicatively coupled to a physical memory (not shown) storing seed set generator 230, document categorizer 250, document packager 260, and GUI generator 280 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of seed set generator 230, document categorizer 250, document packager 260, and GUI generator 280 may be included in the processor itself such that the processor is configured to implement these functions.

Database 220 may be implemented by database 113 of FIG. 1. While database 220 is shown in FIG. 2 to be a single database, database 220 may be implemented as a plurality of databases included in admin subsystem 111 and/or remotely from admin subsystem 111.

Display 290 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

Figure 3:
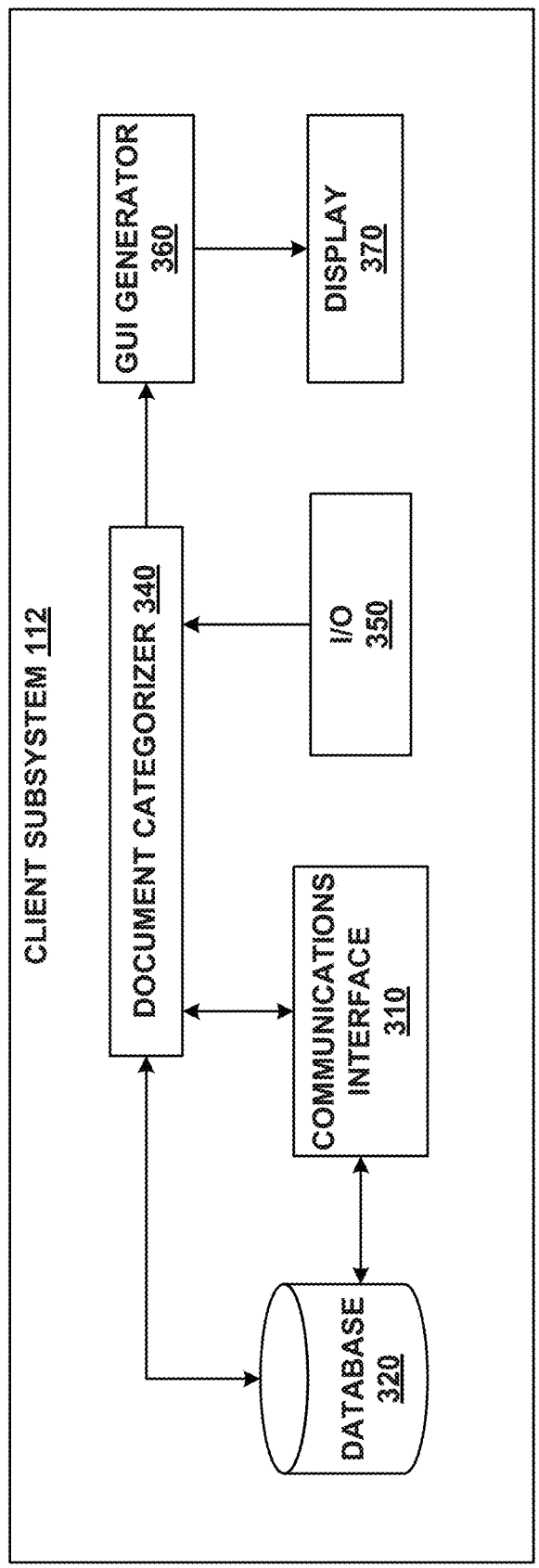
FIG. 3 is a block diagram of an exemplary client subsystem, consistent with embodiments of the present disclosure.

FIG. 3 is a block diagram of an exemplary client subsystem 112 for implementing embodiments and aspects of the present disclosure. The arrangement and number of components included in client subsystem 112 is provided for purposes of illustration. Additional arrangements, number of components, and other modifications may be made, consistent with the present disclosure.

As shown in FIG. 3, client subsystem 112 may include one or more communications interfaces 310. Communications interface 210 may allow electronic data to be transferred between client subsystem 112, admin subsystem 111, database 113, document explorer 120, and/or other components. For example, communications interface 310 may be configured to receive a seed set of electronic documents and store the seed set in database 220.

Examples of communications interface 310 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 310 may receive data in the form of signals, which may be electronic, electromagnetic, optical, or other signals capable of being received by communications interface 310. These signals may be provided to communications interface 310 via a communications path (not shown), which may be implemented using wireless, wire, cable, fiber optics, radio frequency ("RF") link, and/or other communications channels.

Client subsystem 112 may also include one or more databases 320. Database 320 may be configured to store seed sets of electronic documents, electronic document categorizations, user profiles, etc. In some embodiments, database 320 may be used to implement some or all of the functions of database 113 of FIG. 1.

Client subsystem 112 may include a document categorizer 340 that categorizes electronic documents included in the received seed sets from client subsystem 112. Document categorizer 340 may retrieve electronic documents stored in database 320, assign categorizations to the retrieved documents, and store the assigned categorizations along with the electronic documents in database 320. In some embodiments, document categorizer 340 may categorize electronic documents included in a seed set based on input received from a user (i.e., a reviewer). For example, client subsystem 112 may include one or more input/output (I/O) devices 340 (e.g., physical keyboards, virtual touch-screen keyboards, mice, joysticks, styluses, etc.) that are configured to receive user instructions in the form of user input. The received instructions may include instructions to assign one or more categorizations to electronic documents. I/O 240 may provide the received user instructions to document categorizer 340 and document categorizer 340 may execute the instructions.

To facilitate the categorization of electronic documents, client subsystem 112 may provide the user with an interactive document categorization GUI on a display 370. Client subsystem 112 may include a GUI generator 280 that generates the document categorization GUI for display on display 290. The seed document categorization GUI may provide the user the option to search for, select, and view electronic documents included in a seed set; assign subject matter tags to electronic documents, and assign categorizations to electronic documents. The search capabilities provided by client subsystem 112 may be similar to those provided by admin subsystem 111 as described above. The document categorization GUI may also provide the user with a visual indicator of the categorization progress of a seed set. For example, the document categorization GUI may display the number of electronic documents that have been categorized in the seed set (e.g., 340/1000), the percentage of electronic documents that have been categorized (e.g., 35%), or a combination thereof.

Once all the electronic documents in a seed set have been categorized, client subsystem 112 may provide the categorizations to admin subsystem 111 via communications interface 310. In some embodiments, client subsystem 112 may also provide a notification to admin subsystem 111 that the categorizations are available for viewing.

Document categorizer 340 and GUI generator 360 may be implemented as a hardware modules configured to execute the functions described herein. Alternatively, one or more processors suitable for the execution of instructions may be configured to execute the functions of document categorizer 340 and GUI generator 360. For example, suitable processors include both general and special purpose microprocessors, programmable logic devices, field programmable gate arrays, specialized circuits, and any one or more processors of any kind of digital computer that may be communicatively coupled to a physical memory (not shown) storing document categorizer 340 and GUI generator 360 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of document categorizer 340 and GUI generator 360 may be included in the processor itself such that the processor is configured to implement these functions.

Database 320 may be implemented by database 116 of FIG. 1. While database 320 is shown in FIG. 3 to be a single database, database 320 may be implemented as a plurality of databases included in client subsystem 112 and/or remotely from client subsystem 112.

Display 370 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

Figure 4:
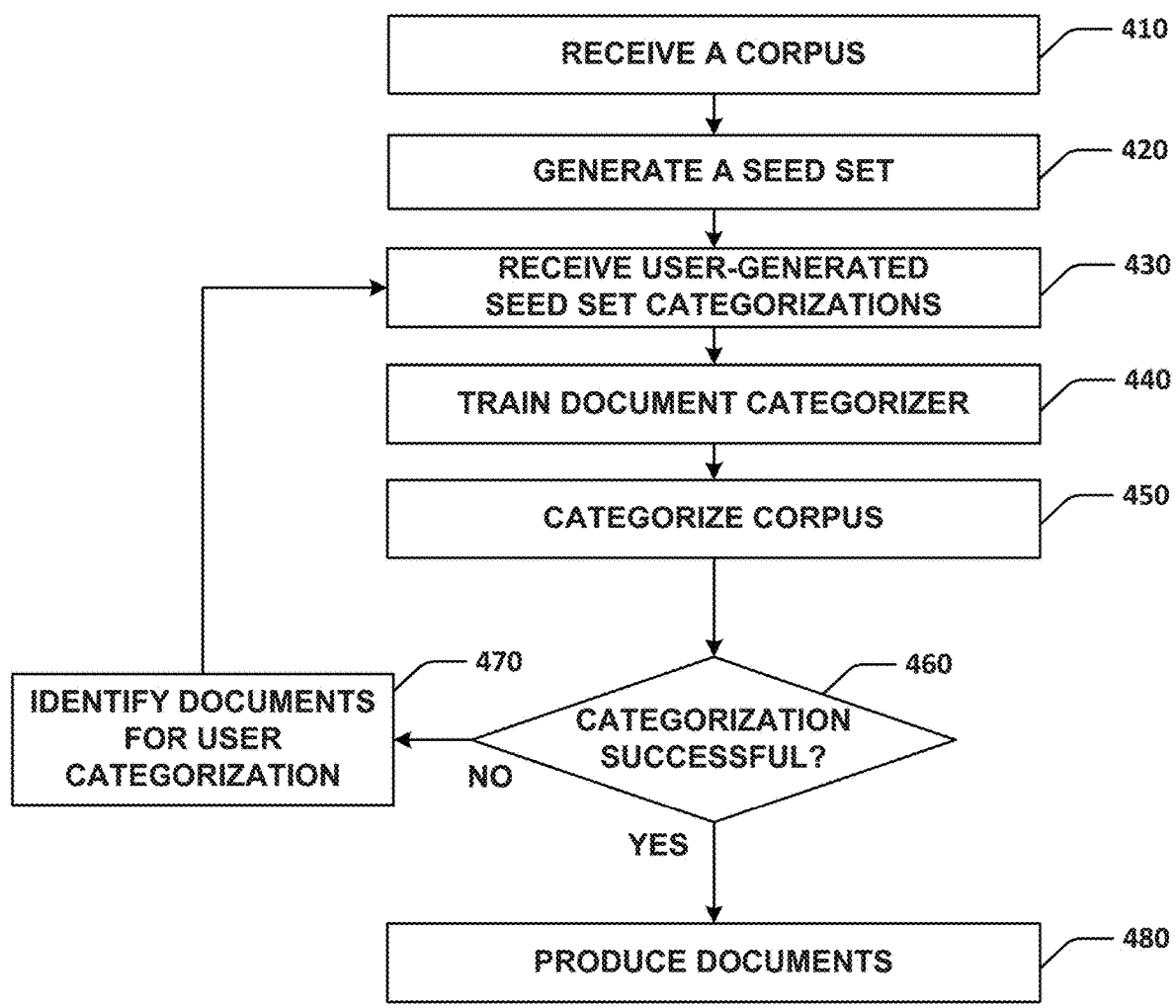
FIG. 4 is a flowchart representing an exemplary method for categorizing electronic documents, consistent with embodiments of the present disclosure.

FIG. 4 depicts a flowchart of an example method 400, consistent with some embodiments and aspects of the present disclosure. Method 400 may be implemented, for example, for categorizing electronic documents. The number and sequence of operations in FIG. 4 are provided for purposes of illustration and may be modified, enhance, substituted, or otherwise changed, in view of the present disclosure. In some embodiments, method 400 may be implemented as one or more computer programs executed by one or more processors. Moreover, in some embodiments, aspects of method 400 may be implemented by an admin subsystem (e.g., admin subsystem 111 included in document identifier 110 and having one or more processors executing one or more computer programs stored on a non-transitory computer readable medium).

In some embodiments, example method 400 may include receiving a corpus of electronic documents at 410. The admin subsystem may receive the corpus from one or more third party devices via a communications interface (e.g., communications interface 210 of FIG. 2). The corpus may be on the order of millions of electronic documents and may include electronic documents of any electronic file format that include various types of content. The content may include, for example, text information, data, images, audio, video, metadata, etc. In some embodiments, the corpus may be associated with a legal proceeding (e.g., discovery), a legal process (e.g., a warrant or subpoena), an investigation, or may be provided in preparation for a legal proceeding.

In some embodiments, example method 400 may include generating a seed set of electronic documents at 420. The seed set may be generated from at least a portion of the electronic documents included in the corpus received at 410. An admin (through the admin subsystem) may select the electronic documents that are to be included in the seed set based on various criteria and/or purposes. For example, the electronic documents may be selected so that there are relatively equal number of likely relevant documents and likely not relevant documents included in the seed set. As another example, the electronic documents may be selected based on subject matter (e.g., documents related to a company, an event, a place, etc.) and may include one or more subject matter topics.

The admin subsystem may provide the seed set generated at 420 to one or more client subsystems (e.g., client subsystem 112) for categorization. The admin subsystem may receive the seed set categorizations from the client subsystem at 430. Each electronic document included in the seed set may be assigned one or more categorizations by the client subsystem. Client subsystem may categorize the electronic documents in the seed set based on input received from a user. Categorizations include relevant, not relevant, confidential, not confidential, privileged, not privileged, etc. The electronic documents may optionally be assigned one or more tags by the client subsystem.

In some embodiments, example method 400 may include training a document categorizer at 440. In order to categorize the remaining electronic documents in the corpus, the document categorizer (e.g., document categorizer 250) may train on the received seed set categorizations using a machine learning algorithm (e.g., machine learning algorithm 252). The machine learning algorithm may be used by a document categorizer to categorize the remaining electronic documents in the corpus received at 410 from which the seed set was generated at 420. The document categorizer may use various machine learning algorithms described above in reference to FIG. 2.

In some embodiments, document categorizer 250 may train on new categorizations as they are received (i.e., as user categorizations of documents in the seed set are received) and may provide the user with newly categorized documents from the corpus as feedback. In other embodiments document categorizer 250 may train on seed set categorizations in batches (i.e., train once all or a portion of user categorizations in the seed set are received).

In some embodiments, example method 400 may include categorizing the electronic documents included in the corpus at 450. For example, the document categorizer trained at 440 may be applied to the remaining electronic documents in the corpus (i.e., the electronic documents that were not included in the seed set categorized by the client sub system) in order to assign categories to those electronic documents. In some embodiments, one or more metrics associated with the performance of the document categorizer may be determined. For example, the document categorizer may determine and assign a confidence modifier to each categorized electronic document that indicates how confident the document categorizer is that the assigned categorization is the correct categorization. As another example, the document categorizer may determine and assign an importance weight to each categorized electronic document that indicates how important the categorization of the electronic document is to the machine learning algorithm for improving the performance of the document categorizer.

In some embodiments, the document categorizer may compare the determined metrics to one or more thresholds to determine if categorization of the corpus was successful at 460. A categorization may be deemed successful when, for example, a threshold number of electronic documents are assigned categorizations with high confidence. When the categorization of the corpus is determined to be successful (460—YES), at least a portion of the categorized electronic documents may be packed for production at 480. For example, all documents categorized as relevant, relevant and not confidential, or relevant, not confidential, and not privileged may be packed and produced to a third party.

When the categorization of the corpus is determined to be unsuccessful (460-NO), and the document categorizer may automatically (i.e., without input from the admin) identify additional electronic documents for generating additional seed sets at 470. Each additional seed set may be categorized by the client subsystem via input from the user. The categorized additional seed set(s) may be used to retrain the document categorizer to improve its categorization performance. Once the document categorizer has been retrained on another seed set, the retrained document categorizer may re-categorize the corpus and recalculate the performance metrics. The document categorizer may iterate through steps 430-470 until the document categorizer determines that one or more of the performance metrics are greater than a threshold value, thereby indicating that the categorization of the corpus is successful (460—YES).

Figure 5:
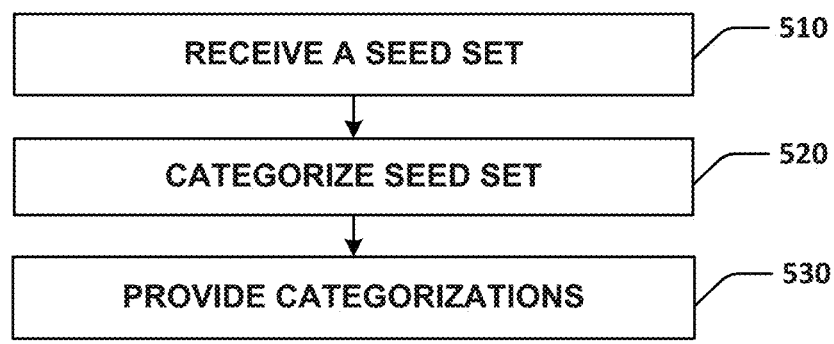
FIG. 5 is a flowchart representing another exemplary method for categorizing electronic documents, consistent with embodiments of the present disclosure.

FIG. 5 depicts a flowchart of an example method 500, consistent with some embodiments and aspects of the present disclosure. Method 500 may be implemented, for example, for categorizing electronic documents. The number and sequence of operations in FIG. 5 are provided for purposes of illustration and may be modified, enhance, substituted, or otherwise changed, in view of the present disclosure. In some embodiments, method 500 may be implemented as one or more computer programs executed by one or more processors. Moreover, in some embodiments, aspects of method 500 may be implemented by a client subsystem (e.g., client subsystem 112 included in document identifier 110 and having one or more processors executing one or more computer programs stored on a non-transitory computer readable medium).

In some embodiments, example method 500 may include receiving a seed set of electronic documents at 510. The client subsystem may receive the seed set from an admin subsystem via a communications interface (e.g., communications interface 310 of FIG. 3). The electronic documents may include any electronic file format that includes various types of content. The content may include, for example, text information, data, images, etc.

In some embodiments, example method 500 may include categorizing the electronic documents included the received seed set at 520. The client subsystem may include a document categorizer (e.g., document categorizer 330 of FIG. 3) that assigns one or more categories to each of the electronic files included in the received seed set. In some embodiments, the document categorizer may assign categories to the electronic files based on input received from a user. Examples of assigned categories includes relevant, not relevant, confidential, not confidential, privileged, not privileged, etc.

In some embodiments, example method 500 may include providing the assigned categorizations of the electronic documents at 530. The client subsystem may provide the assigned categorizations to admin subsystem. For example, the client subsystem may provide the assigned categorizations to admin subsystem as part of 430 of exemplary method 400 illustrated in FIG. 4. The client subsystem may optionally provide a notification to admin subsystem that the assigned categorizations are available for viewing.

Figure 6:
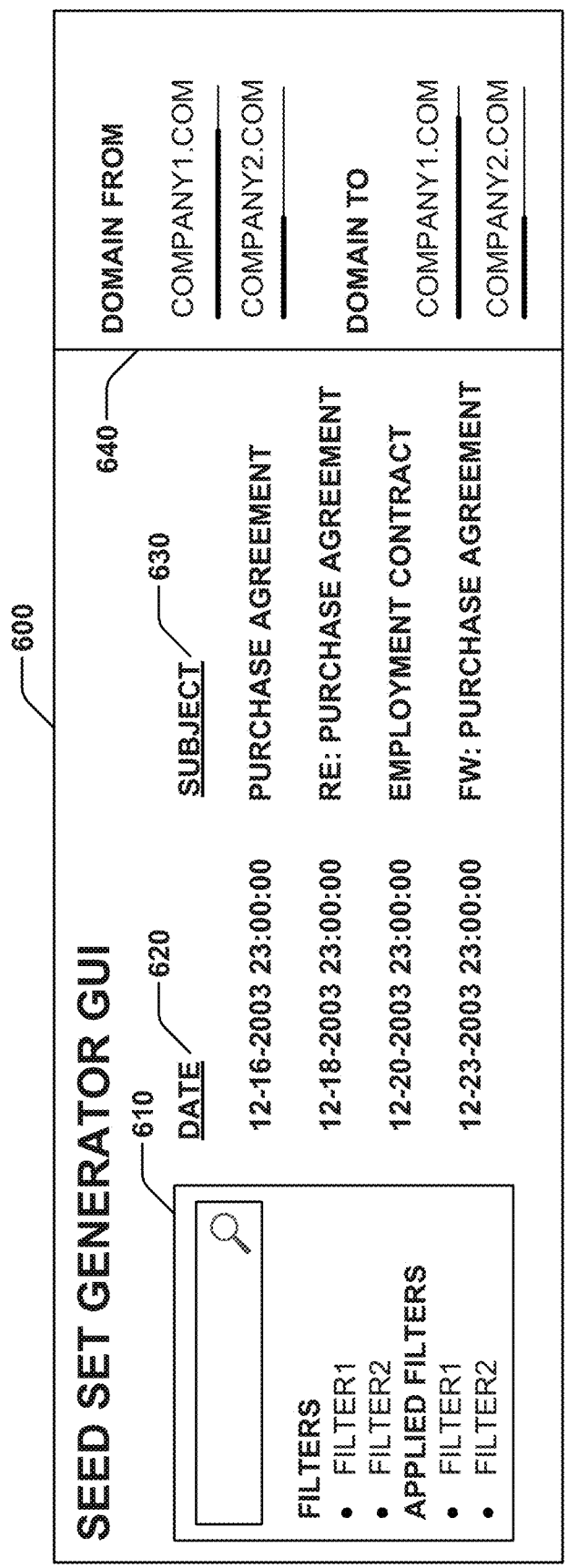
FIG. 6 is an illustration of an exemplary graphical user interface for generating seed sets of electronic documents, consistent with embodiments of the present disclosure.

FIG. 6 depicts an illustration of an exemplary seed set generator GUI 600 for generating seed sets of electronic documents, according to some embodiments of the present disclosure. Seed set generator GUI 600 may be generated by a GUI generator (e.g., GUI generator 280) of an admin subsystem (e.g., admin subsystem 111). As shown in FIG. 6, seed set generator GUI 600 may include a corpus explorer 610 that allows users to search and filter a corpus of electronic documents to identify electronic documents to include in a seed set. Corpus explorer 610 may include a search engine that allows user to input various search terms to search metadata and content of electronic documents included in the corpus. Corpus explorer 610 may also include filters that allow the user to filter the corpus using various positive and/or negative filters. Positive filters may include filters that identify metadata and content that the user desires the filtered electronic documents to include. For example, a positive filter that specifies "documents created before Jan. 13, 2012" will return electronic documents that were created before Jan. 13, 2012. Negative filters may include filters that identify metadata and content that the user does not want the filtered electronic documents to include. For example, a negative filter that specifies "documents created before Jan. 13, 2012" will omit electronic documents that were created before Jan. 13, 2012 from the search results.

The available filters provided by corpus explorer 610 may be displayed on seed set generator GUI 600 in various configurations. For example, the available filters may be displayed in a drop-down menu, in a list where each filter has an associated checkbox that allows the user to selected the filter, in a search query window where the user can search for and select filters, or any combination thereof. Corpus explorer 610 may also display a list of applied filters so that the user may keep track of which filters are currently applied to a corpus.

Seed set generator GUI 600 may display the electronic documents included in the corpus. If any filters and/or search terms have been specified, the displayed electronic documents will conform to the specified filters and/or search terms. Displayed electronic documents may be sorted using various property fields. FIG. 6 shows date field 620 for sorting by various date properties (e.g., date sent, date received, date created, date modified) and subject field 630 for sorting by various document subject titles (e.g., email titles, file names, etc.). While FIG. 6 shows seed set generator GUI 600 including date field 620 and subject field 630, other property fields associated with electronic documents may be displayed and in any combination.

Seed set generator GUI 600 may also include a seed set properties pane 640 that displays various properties associated with seed sets as they are generated. The properties displayed in seed set properties pane 640 may include various metadata properties associated with the electronic documents included in a seed set, such as domain names of email addresses in To and From email properties, email addresses, entities, file types, etc. Seed set properties pane 640 may also display the number of electronic documents included in the seed set.

Figure 7:
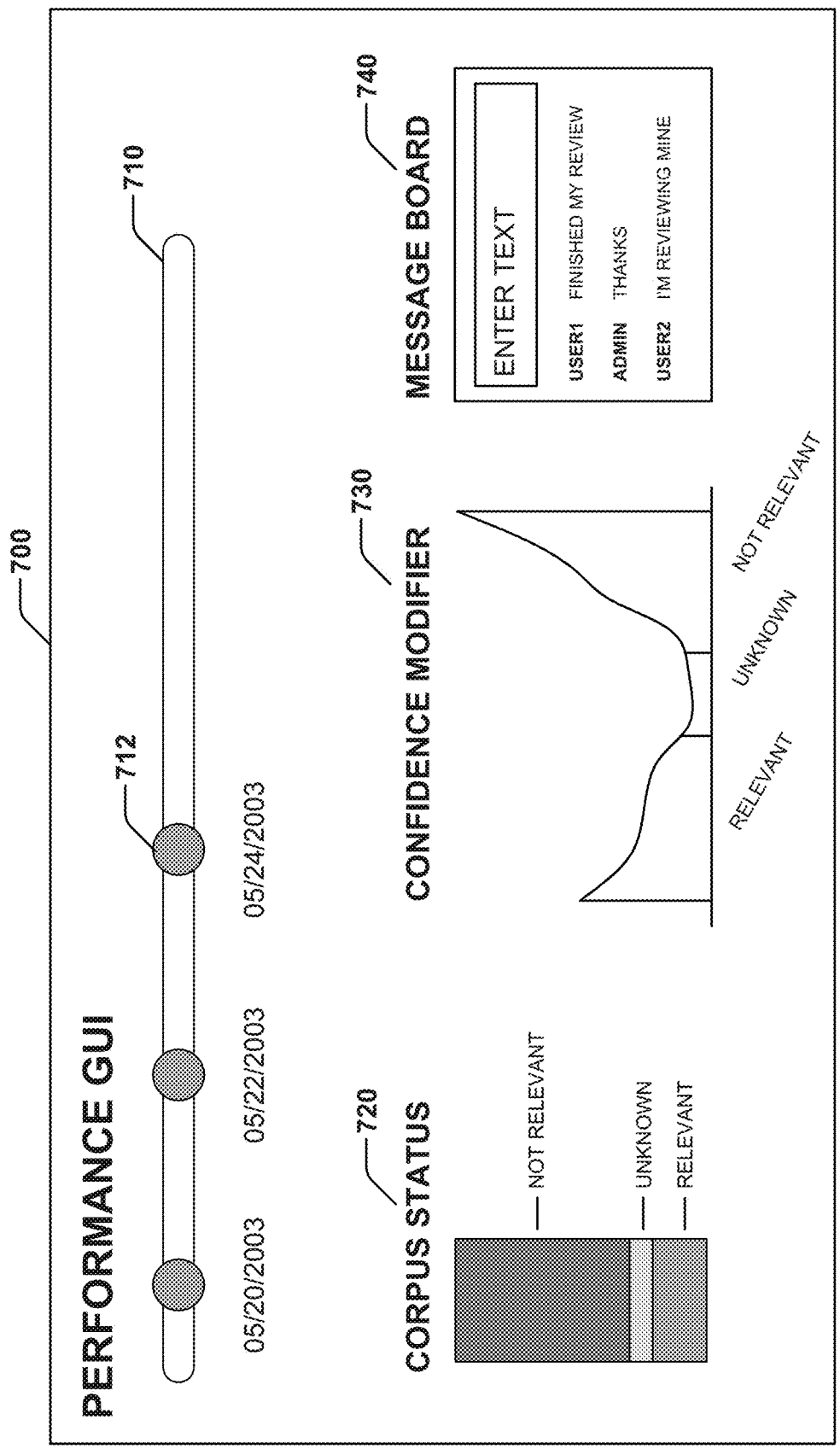
FIG. 7 is an illustration of an exemplary graphical user interface for tracking performance of a document categorizer, consistent with embodiments of the present disclosure.

FIG. 7 depicts an illustration of an exemplary performance GUI 700 for tracking performance of a document categorizer (e.g., document categorizer 250), according to some embodiments of the present disclosure. Performance GUI 700 may be generated by a GUI generator (e.g., GUI generator 280) of an admin subsystem (e.g., admin subsystem 111). As shown in FIG. 7, performance GUI 700 may include a seed set tracker 710 that tracks various milestones 712 that indicate when the seed sets were generated by the admin subsystem. Performance GUI 700 may also include a corpus status tracker 720 that tracks the categorization makeup of the electronic documents included in a corpus. For example, as shown in FIG. 7, corpus status tracker 720 may be implemented as a bar graph that visually indicates the number of electronic documents categorized as not relevant, relevant, and the number of electronic documents with an unknown categorization status.

Performance GUI 700 may further include a confidence modifier tracker 730 that tracks the overall confidence of the categorizations of the electronic documents included in the corpus. Confidence modifier tracker 730 may be implemented as a graph partitioned into different categorization types (relevant, unknown, and not relevant, as shown). The x-axis of the graph may represent a continuum of the confidence modifiers assigned to the electronic documents and the y-axis may represent the number of electronic documents assigned to each confidence modifier value. Electronic documents plotted on the graph that falls further toward the ends of the graph may be assigned higher confidence modifier values than electronic documents toward the center of the graph. Accordingly, a confidence modifier tracker 730 plot with a strong bimodal distribution may indicate that there is a high confidence that the categorizations assigned to the electronic documents in the corpus are accurate.

Performance GUI 700 may also include a message board 740 that may be used to communicate with team members assigned to categorize a corpus.

Figure 8:
FIG. 8 is an illustration of an exemplary graphical user interface for identifying and categorizing electronic documents, consistent with embodiments of the present disclosure.

FIG. 8 depicts an illustration of an exemplary document categorization GUI 800 for categorizing electronic documents, according to some embodiments of the present disclosure. Document categorization GUI 800 may be generated by a GUI generator (e.g., GUI generator 360) of a client subsystem (e.g., client subsystem 112). As shown in FIG. 8, document categorization GUI 800 may include a seed set explorer 810 that allows users to search through and select electronic documents included in a seed set. Document categorization GUI 800 may also include a reading pane 820 for displaying the contents of an electronic document selected from seed set explorer 810.

Document categorization GUI 800 may further include an input pane 830 that allows a user (i.e., a reviewer) to provide various inputs associated with an electronic document displayed by reading pane 820. For example, input pane 830 may allow the user to assign various tags and/or categorizations to the electronic document displayed by reading pane 820. A user may assign a category to the electronic document by selecting either the checkmark button or the X button. These buttons may be assigned to various mutually exclusive categories (e.g., relevant and not relevant, confidential and not confidential, privileged, not privileged, etc.). Input pane 830 may also display various status indicators associated with the seed set being categorized by the user. For example, input pane 830 may display the number of electronic documents that have been categorized in the seed set and/or the percentage of electronic documents that have been categorized.

Figure 9:
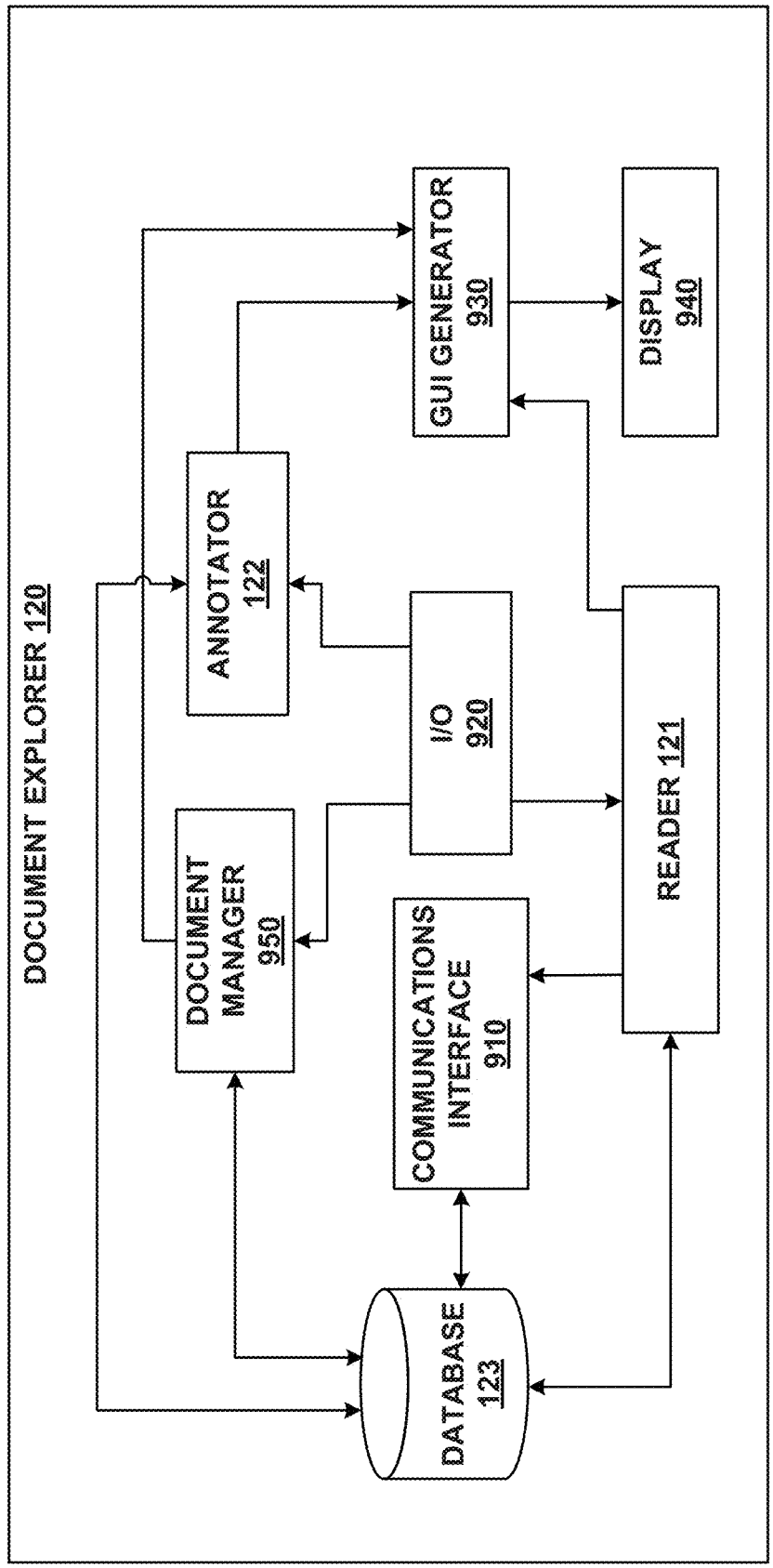
FIG. 9 is a block diagram of a document explorer, consistent with embodiments of the present disclosure.

FIG. 9 is an example detailed block diagram of document explorer 120 for implementing embodiments and aspects of the present disclosure. The arrangement and number of components included in document explorer 120 is provided for purposes of illustration. Additional arrangements, number of components, and other modifications may be made, consistent with the present disclosure.

As shown in FIG. 9, in addition to reader 121, annotator 122, and database 123, document explorer 120 may include one or more communications interfaces 910. Communications interface 210 may allow electronic data to be transferred between document explorer 120 and document identifier 110, and/or other components. For example, communications interface 910 may be configured to receive electronic documents and store the seed set in database 123.

Examples of communications interface 910 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 910 may receive data in the form of signals, which may be electronic, electromagnetic, optical, or other signals capable of being received by communications interface 910. These signals may be provided to communications interface 910 via a communications path (not shown), which may be implemented using wireless, wire, cable, fiber optics, radio frequency ("RF") link, and/or other communications channels.

In some embodiments, reader 121 may provide the user with an interactive reader GUI on a display 940. Document explorer 120 may include a GUI generator 930 that generates the reader GUI for display on display 930. The reader GUI may provide the user the ability to view received electronic documents. The reader GUI may also provide the user with the ability to interact with displayed electronic documents. For example, document explorer 120 may include one or more input/output (I/O) devices 920 (e.g., physical keyboards, virtual touch-screen keyboards, mice, joysticks, styluses, etc.) that are configured to receive user instructions in the form of user input. The received instructions may include instructions to display one or more electronic documents. I/O 920 may provide the received user instructions to reader 121 and reader 121 may execute the instructions.

Annotator 122 may be used to add annotations to the electronic document being displayed on the reader GUI. For example, a portion of the text included in the displayed electronic document may be selected based on input received from the user via I/O 920. In response to the user selecting the text, annotator 122, via GUI generator 930, may generate a display of a popup window on display 940. The popup window may present the user with a summary of the text they have selected along with metadata associated with the selection (e.g., when the text was selected, user name associated with the user who selected the text, file name of the electronic file from with the text was selected, etc.), and may provide the user with a text box to input comments. The user may enter comments into the text box and save the annotation to the electronic file. Annotator 122 may save the combination of the selected text and the associated annotation as a snippet in database 123.

Document explorer 120 may include a document manager 950 that may import annotations and their associated text from electronic files (collectively referred to as snippets) into clusters. Snippets may be grouped into clusters based on various criteria. For example, snippets may be grouped based on input received from a user. In order to facilitate the grouping of snippets into clusters, document manager 950 may, via GUI generator 930, provide the user with an interactive Custer GUI on display 940. The Cluster GUI may display all or a portion of the snippets included in database 123. The user may interact with the displayed snippets in various ways to assign them to one or more clusters. The user may assign snippets to clusters by, for example, dragging and dropping snippets onto clusters, selecting a desired cluster from a drop-down menu, checking the appropriate checkbox, etc. The user may assign an order to the snippets once assigned to a cluster.

In other examples, snippets may be assigned to clusters automatically be document manager 950. For example, document manager 950 may assign snippets to a cluster based on a time period (e.g., time periods automatically selected by document manager 950 and/or selected by the user). Time periods may include a date range in which snippets were created or in which the electronic documents from which the selected text included in the snippets were created. Time periods may also specify a date in which all snippets created before or after are to be included. Clusters created based on time periods may be sorted chronologically.

Another example criteria for document manager 950 automatically to assign snippets to clusters includes persons associated with the snippets. For example, document manager 950 may analyze metadata associated with the electronic documents from which the text included in the snippets was selected to determine a person and/or organization. The person may be, for example, the sender or recipient of an email (associated with email address), the creator of a document, etc. The organization may be, for example, an organization associated with persons sending or receiving emails determined from the domain name associated with the sender and receiver email addresses. Other examples of criteria for which snippets may be assigned to clusters include subject matter, user who created the snippets, document type from which the snippet was imported. Document manager 950 may store generated clusters in database 123.

Document manager 950 may generate a work-product electronic document, such as a legal memorandum, from the imported snippets. Moreover, document manager 950 may generate links between the snippets included in the generated work-product electronic document and the source electronic document (i.e., the electronic document from which the snippet originated). The links between snippets and source electronic documents are particularly useful for maintaining traceability between information used in a generated work-product electronic document and the electronic documents used to support the information. The generated links not only provide a solution for quickly identifying the origin of information used in a generated work-product electronic document, they also allow users to identify other electronic documents that may contain similar content. For example, a user that is interested in more information related to a snippet included in a generated work-product electronic document may use the link between the snippet and its source electronic document to identify the source electronic document and use the source electronic document to find electronic documents including similar content. Document manager 950 may store generated work-product electronic documents database 123.

In some embodiments, document explorer 120 may provide for collaboration between users and teams of users. Database 123 may serve as a central repository for electronic documents, snippets, clusters, generated work-product electronic documents, other data and information (e.g., network graphs, maps, charts, histograms, etc.), and users' written thoughts and interpretations of the data and information stored in database 123. Users given access rights to document explorer 120 may log in and view and comment on work-product, snippets, clusters, and other electronic documents and information created by other users. Accordingly, users can use snippets and clusters created by other users to form their own clusters and work-product electronic documents, as well as provide feedback to users on their created snippets/clusters/work-product. As an example of the above, a team of attorneys working on an electronic draft of a memo analyzing a potential fraud by Corporation XYZ may review and comment on snippets and clusters created by members of the team. The team members may provide feedback such as why or why not a particular snippet created by a team member serves as good evidence to prove an element of Corporation XYZ's fraud.

Reader 121, annotator 122, GUI generator 930, and document manager 950 may be implemented as a hardware modules configured to execute the functions described herein. Alternatively, one or more processors suitable for the execution of instructions may be configured to execute the functions of reader 121, annotator 122, GUI generator 930, and document manager 950. For example, suitable processors include both general and special purpose microprocessors, programmable logic devices, field programmable gate arrays, specialized circuits, and any one or more processors of any kind of digital computer that may be communicatively coupled to a physical memory (not shown) storing reader 121, annotator 122, GUI generator 930, and document manager 950 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of reader 121, annotator 122, GUI generator 930, and document manager 950 may be included in the processor itself such that the processor is configured to implement these functions.

While database 123 is shown in FIG. 9 to be a single database, database 123 may be implemented as a plurality of databases included in document explorer 120 and/or remotely from document explorer 120.

Display 940 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

Figure 10:
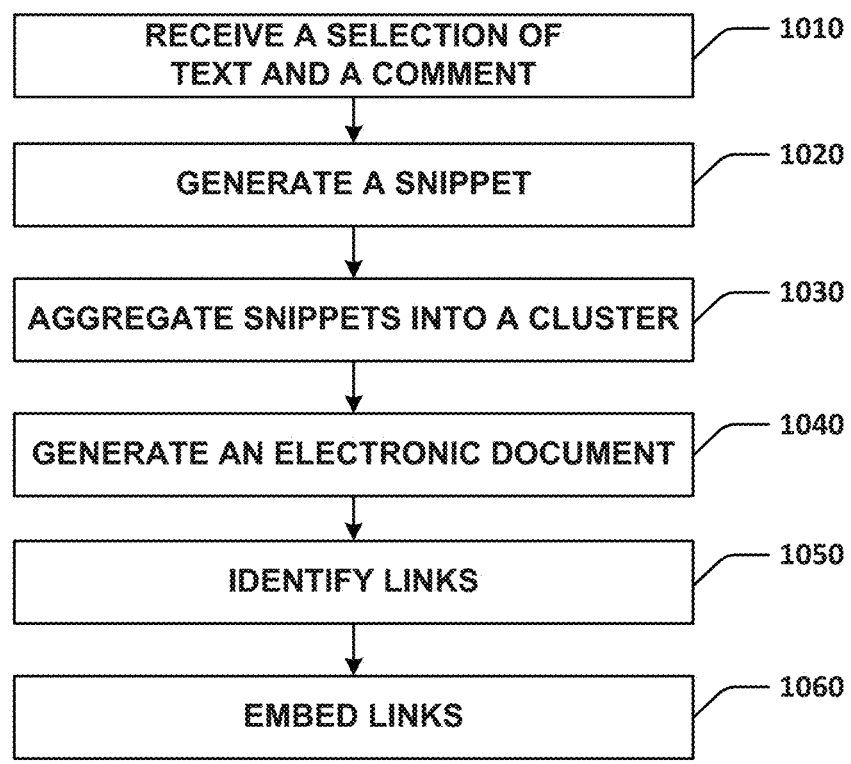
FIG. 10 is a flow diagram depicting an example method for annotating and linking electronic documents, consistent with embodiments of the present disclosure.

FIG. 10 depicts a flowchart of an example method 1000, consistent with some embodiments and aspects of the present disclosure. Method 1000 may be implemented, for example, for linking electronic documents. The number and sequence of operations in FIG. 10 are provided for purposes of illustration and may be modified, enhance, substituted, or otherwise changed, in view of the present disclosure. In some embodiments, method 1000 may be implemented as one or more computer programs executed by one or more processors. Moreover, in some embodiments, aspects of method 1000 may be implemented by a document explorer (e.g., document explorer 120 and having one or more processors executing one or more computer programs stored on a non-transitory computer readable medium).

In some embodiments, example method 1000 may include receiving a selection of text and a comment at 1010. The document explorer may receive the selection of text and the comment in the form of input from a user. The user may select text in an electronic document and associate a comment with the selection. The selection and comment may be saved in a database (e.g., database 123) as an annotation along with the source electronic document.

In some embodiments, example method 1000 may include generating a snippet at 1020. The document explorer may generate the snippet from the stored text selection and associated comment. In some embodiments, the document explorer may generate a plurality of snippets from a plurality of text selections and comments associated with a plurality of electronic documents.

In some embodiments, example method 1000 may include aggregating the snippets into a cluster at 1030. The document explorer may aggregate the snippets into clusters based on various criteria. For example, document explorer may aggregate snippets into clusters based on the subject matter included in the snippets, based on a legal theory, based on metadata, etc.

In some embodiments, example method 1000 may include generating an electronic document at 1040. The document explorer may generate the electronic document from one or more clusters of snippets. For example, the document explorer may import the selected text in each snippet into the generated electronic document and add the comment as a footnote to the generated electronic document.

In some embodiments, example method 1000 may include generating links at 1050. The document explorer may generate a link between a snippet included in the electronic document generated at 1040 and the source electronic document from which the snippet was generated. The link may be generated based on metadata included in the snippet. For example, a snippet may include the file name of the source electronic document or a document number. The document explorer may generate a link between the snippet and the source electronic document based on the file name and/or document number.

In some embodiments, example method 1000 may include embedding the generated links at 1060. The document explorer may embed the links generated at 1050 in the electronic document at 1040. The embedded link may be used for traceability back to the source of where the content in the snippet originated. Accordingly, as the generated electronic document is further modified by a user, the user may explore the source of the snippets included in the generated electronic document to, for example, find additional electronic documents that may be useful to the user.

Figure 11A:
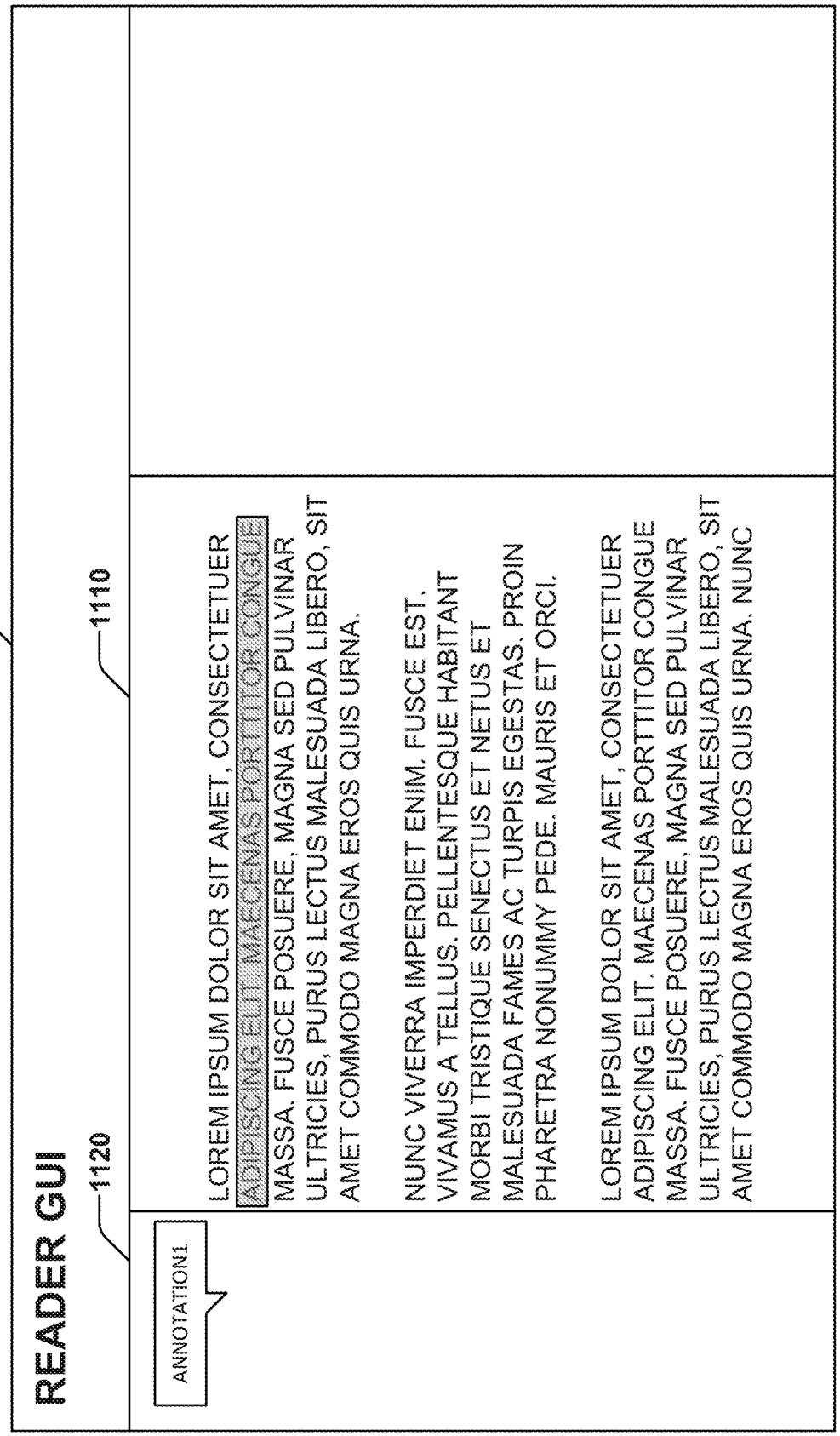
FIGS. 11A and 11B are illustrations of exemplary graphical user interfaces for exploring and annotating electronic documents, consistent with embodiments of the present disclosure.
Figure 11B:
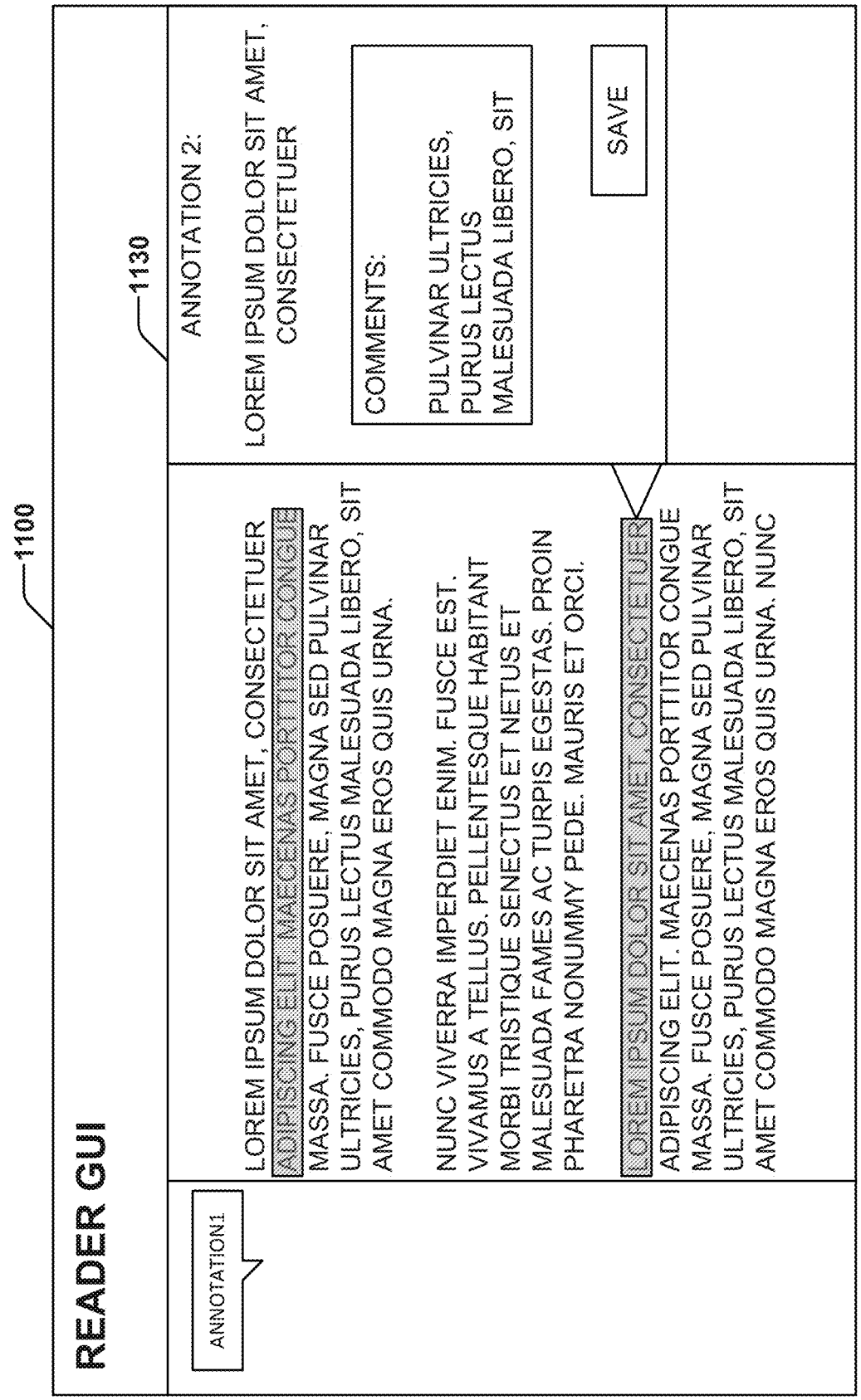

FIGS. 11A and 11B depict an illustration of an exemplary reader GUI 1100 for reading and annotating electronic documents, according to some embodiments of the present disclosure. Reader GUI 1100 may be generated by a GUI generator (e.g., GUI generator 930) of a document explorer (e.g., document explorer 120). As shown in FIG. 11A, reader GUI 1100 may display the contents of an electronic document in a readying pane 1110. Reader GUI 1100 may also display annotations 1120 assigned to a portion of the content in the displayed electronic document (highlighted in FIG. 11A).

As shown in FIG. 11B, a user may select a portion of the displayed content. In response to the user's selection, reader GUI 1100 may display a popup window 1130 for creating a new annotation for the displayed electronic document. Popup window 1130 may display a summary of the text selected by the user and may also display metadata associated with the selected text and/or the electronic document. Popup window 1130 may also display a text box that allows the user to add comments to the annotation. Once the user is satisfied with the annotation, the user may select the save button and save the new annotation to the electronic document.

Figure 12:
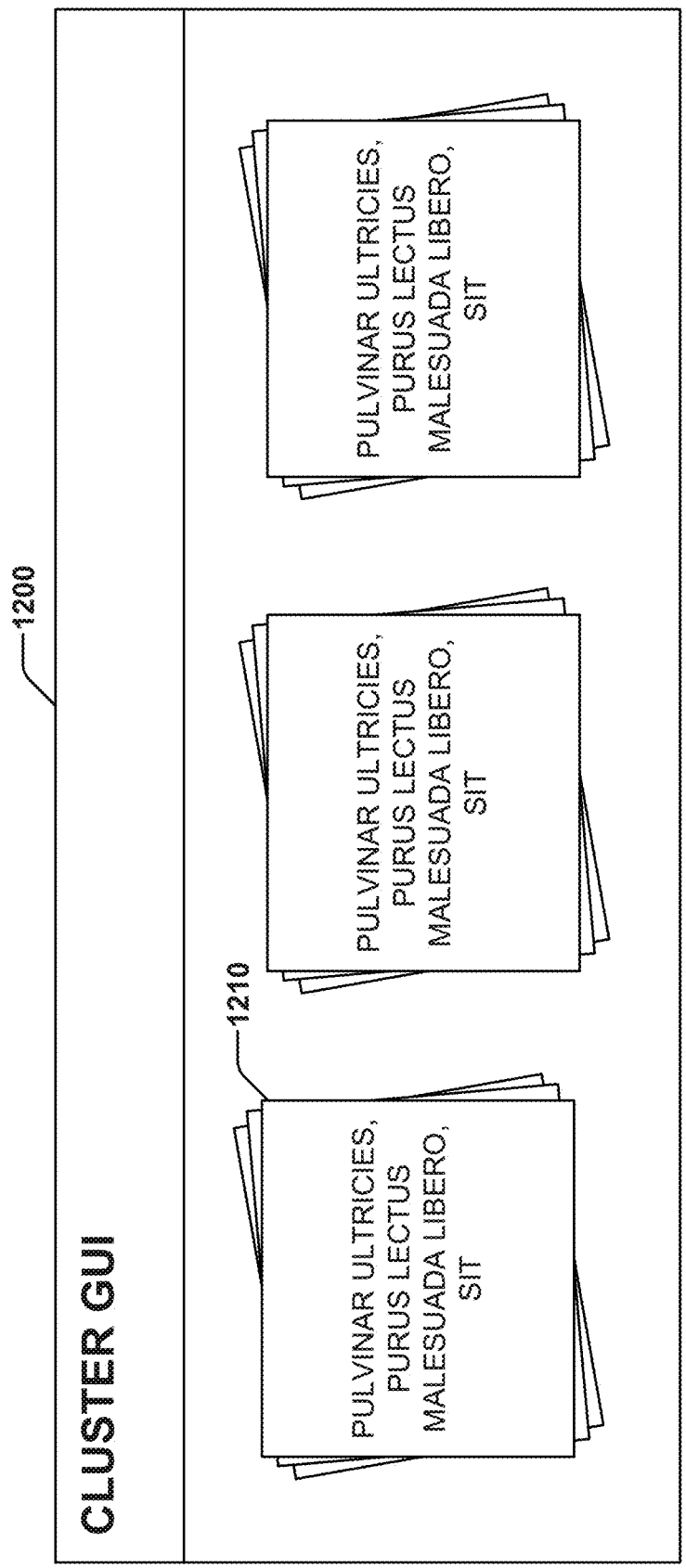
FIG. 12 is an illustration of an exemplary graphical user interface for managing clusters of snippets, consistent with embodiments of the present disclosure.

FIG. 12 depicts an illustration of an exemplary cluster GUI 1200 for clustering snippets, according to some embodiments of the present disclosure. Cluster GUI 1200 may be generated by a GUI generator (e.g., GUI generator 930) of a document explorer (e.g., document explorer 120). As shown in FIG. 12, cluster GUI 1200 may various snippet clusters 1210. Snippet clusters 1210 may be rearranged, reordered, deleted, modified, etc., based on input received from a user.

Selecting a snippet cluster 1210 may prompt cluster GUI 1200 to display all of the snippets included in the snippet cluster 1210. A user may select a particular snippet and edit the annotation or comment included in the snippet. Cluster GUI 1200 may also display an interactive link associated with the selected snippet that displays the original electronic document from which the snippet was imported upon interacting with the link.

It is to be understood that FIG. 12 merely illustrates one example implementation for clustering snippets and generating electronic documents from the clusters. Other examples are described in U.S. patent application Ser. No.

14/831,338, filed on Aug. 31, 2015 the content of which is incorporated by reference in its entirety.

Embodiments of the present disclosure have been described herein with reference to numerous specific details that can vary from implementation to implementation. Certain adaptations and modifications of the described embodiments can be made. For example, document identifier 110 and document explorer 120 may operate independently of each other or may be incorporated into one system. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system for linking electronic documents, the system comprising:
   a memory device that stores a set of instructions;
   at least one processor configured to execute the instructions to:
      receive, from a first user, user inputs comprising selections of content from source electronic documents;
      in response to the respective user inputs from the first user, generate a plurality of respective snippets that each comprise the respective content selected from the source electronic documents;
      receive, from the first user, one or more annotations to at least some of the plurality of snippets, wherein the snippets comprise the associated received annotations;
      aggregate the snippets into clusters;
      generate links between the snippets and their respective source documents based on metadata included in the respective snippets;
      generate, from the clusters of snippets, one or more electronic documents that include respective clusters of snippets and associated annotations;
      embed the respective links between the respective snippets and their respective source documents in the one or more electronic documents;
      receive, from a second user different from the first user, a further user input associated with at least one of: a snippet of the plurality of snippets, a cluster, or an electronic document of the one or more electronic documents; and
      associate the further user input with the related snippet, cluster, or electronic document.

2. The system of claim 1, wherein further user input comprises at least one of: text inputs, or other types of content inputs.

3. The system of claim 1, wherein the respective one or more electronic documents each display respective content of each of the snippets of the respective clusters and associated annotations as footnotes.

4. The system of claim 1, wherein the snippets are aggregated into clusters based on at least one of: attributes of the snippets and/or source electronic documents, types of the snippets and/or source electronic documents, purposes associated with the snippets and/or source electronic documents, a time period, or persons associated with source electronic documents.

5. The system of claim 1, wherein the at least one processor is further configured to execute the instructions to:
   determine content of the selections of content; and
   aggregate the snippets into clusters based at least in part on one or more of: the determined content, times associated with the user inputs, or metadata associated with the respective user inputs.

6. The system of claim 1, wherein the snippets include metadata associated with corresponding source electronic documents.

7. The system of claim 6, wherein the metadata included in the snippets includes file names associated with the source electronic documents.

8. The system of claim 6, wherein the metadata included in the snippets includes document numbers associated with the source electronic documents.

9. The system of claim 1, wherein the one or more annotations comprise further user inputs associated with at least some of the selections of content from the source electronic documents, wherein the further user inputs comprise one or more of: text inputs associated with at least some of the selections of content from the source electronic documents, other types of content inputs associated with at least some of the selections of content from the source electronic documents, or links to other electronic documents.

10. A computer-implemented method for linking electronic documents, the computer-implemented method comprising:
    receiving, from a first user, user inputs comprising selections of content from source electronic documents;
    in response to the respective user inputs from the first user, generating a plurality of respective snippets that each comprise the respective content selected from the source electronic documents;
    receiving, from the first user, one or more annotations to at least some of the plurality of snippets, wherein the snippets comprise the associated received annotations;
    aggregating the snippets into clusters;
    generating links between the snippets and their respective source documents based on metadata included in the respective snippets;
    generating, from the clusters of snippets, one or more electronic documents that include respective clusters of snippets and associated annotations;
    embedding the respective links between the respective snippets and their respective source documents in the one or more electronic documents;
    receiving, from a second user different from the first user, a further user input associated with at least one of: a snippet of the plurality of snippets, a cluster, or an electronic document of the one or more electronic documents; and
    associating the further user input with the related snippet, cluster, or electronic document.

11. The computer-implemented method of claim 10, wherein further user input comprises at least one of: text inputs, or other types of content inputs.

12. The computer-implemented method of claim 10, wherein the respective one or more electronic documents each display respective content of each of the snippets of the respective clusters and associated annotations as footnotes.

13. The computer-implemented method of claim 10, wherein the snippets are aggregated into clusters based on at least one of: attributes of the snippets and/or source electronic documents, types of the snippets and/or source electronic documents, purposes associated with the snippets and/or source electronic documents, a time period, or persons associated with source electronic documents.

14. The computer-implemented method of claim 10 further comprising:
   determining content of the selections of content; and
   aggregating the snippets into clusters based at least in part on one or more of: the determined content, times associated with the user inputs, or metadata associated with the respective user inputs.

15. The computer-implemented method of claim 10, wherein the snippets include metadata associated with corresponding source electronic documents.

16. The computer-implemented method of claim 15, wherein the metadata included in the snippets includes file names associated with the source electronic documents.

17. The computer-implemented method of claim 15, wherein the metadata included in the snippets includes document numbers associated with the source electronic documents.

18. The computer-implemented method of claim 10, wherein the one or more annotations comprise further user inputs associated with at least some of the selections of content from the source electronic documents, wherein the further user inputs comprise one or more of: text inputs associated with at least some of the selections of content from the source electronic documents, other types of content inputs associated with at least some of the selections of content from the source electronic documents, or links to other electronic documents.

* * * * *